US012619743B2

(12) United States Patent
Sforzin et al.

(10) Patent No.: US 12,619,743 B2
(45) Date of Patent: May 5, 2026

(54) NON-CACHED DATA TRANSFER

(71) Applicant: Micron Technology, Inc., Boise, ID (US)

(72) Inventors: Marco Sforzin, Cernusco sul Naviglio (IT); Paolo Amato, Treviglio (IT)

(73) Assignee: Micron Technology, Inc., Boise, ID (US)

( * ) Notice: Subject to any disclaimer, the term of this patent is extended or adjusted under 35 U.S.C. 154(b) by 250 days.

(21) Appl. No.: 18/215,462

(22) Filed: Jun. 28, 2023

(65) Prior Publication Data

US 2024/0005010 A1      Jan. 4, 2024

Related U.S. Application Data

(60) Provisional application No. 63/357,516, filed on Jun. 30, 2022.

(51) Int. Cl.
*G06F 21/60* (2013.01)
*G06F 11/10* (2006.01)
*G06F 21/31* (2013.01)

(52) U.S. Cl.
CPC ........ *G06F 21/602* (2013.01); *G06F 11/1068* (2013.01); *G06F 21/31* (2013.01)

(58) Field of Classification Search
CPC ..... G06F 11/1068; G06F 21/31; G06F 21/602
See application file for complete search history.

(56) References Cited

U.S. PATENT DOCUMENTS

| | | | | |
|---|---|---|---|---|
| 7,036,066 B2 * | 4/2006 | Weibel | ................... | G11B 20/12 |
| | | | | 714/752 |
| 8,468,417 B2 * | 6/2013 | Asnaashari | ............. | G06F 13/28 |
| | | | | 714/758 |
| 8,799,681 B1 * | 8/2014 | Linnell | ............... | G06F 21/6218 |
| | | | | 713/193 |
| 9,697,140 B2 * | 7/2017 | Kwok | ................. | G06F 12/1408 |
| 10,733,048 B1 * | 8/2020 | Avron | ................. | G06F 11/1012 |
| 11,170,869 B1 * | 11/2021 | Helmick | ........... | H03M 13/1145 |
| 11,687,273 B2 | 6/2023 | Confalonieri et al. | | |
| 2006/0248434 A1 * | 11/2006 | Radke | ..................... | G06F 11/10 |
| | | | | 714/763 |
| 2007/0283224 A1 * | 12/2007 | Kirschner | ........... | G06F 11/1012 |
| | | | | 714/E11.038 |

(Continued)

FOREIGN PATENT DOCUMENTS

CN        111752743 A   * 10/2020   .......... G06F 11/1012

OTHER PUBLICATIONS

Deutsch, S et al. CN 111752743 A (machine translation), published Oct. 9, 2020. (Year: 2020).*

(Continued)

*Primary Examiner* — Michael Simitoski
(74) *Attorney, Agent, or Firm* — Brooks, Cameron & Huebsch, PLLC

(57) ABSTRACT

A memory controller can operate to provide various data protection schemes without a need of a cache. A unit of data transfer between the memory controller and memory devices can correspond to a size of data corresponding to a host read and/or write command. The memory controller operating without a cache can still ensure data integrity of the memory system to be compliant with standardized requirements and/or protocols, such as trusted execution engine security protocol (TSP).

18 Claims, 12 Drawing Sheets

(56) References Cited

U.S. PATENT DOCUMENTS

| | | | | |
|---|---|---|---|---|
| 2009/0044077 | A1* | 2/2009 | Choi | G11B 20/00086 |
| | | | | 714/764 |
| 2011/0214011 | A1* | 9/2011 | Grube | G06F 11/1092 |
| | | | | 714/E11.062 |
| 2016/0344428 | A1* | 11/2016 | Wang | H04L 1/0042 |
| 2017/0091026 | A1* | 3/2017 | Gulati | G11C 29/52 |
| 2017/0185532 | A1* | 6/2017 | Durham | G06F 11/1004 |
| 2017/0220414 | A1* | 8/2017 | Circello | H03M 13/2927 |
| 2018/0091308 | A1* | 3/2018 | Durham | H04L 9/3242 |
| 2018/0181499 | A1* | 6/2018 | Branco | H04L 9/0662 |
| 2018/0329766 | A1* | 11/2018 | Nagashima | G06F 11/1004 |
| 2019/0013086 | A1* | 1/2019 | Spencer | G06F 13/1673 |
| 2019/0042369 | A1* | 2/2019 | Deutsch | G06F 3/0673 |
| 2019/0042796 | A1* | 2/2019 | Von Bokern | G06F 9/45558 |
| 2019/0163569 | A1* | 5/2019 | Lee | G06F 11/1068 |
| 2020/0201711 | A1* | 6/2020 | Kim | G06F 11/1076 |
| 2022/0148670 | A1* | 5/2022 | Lee | G11C 29/52 |
| 2022/0207190 | A1* | 6/2022 | Chhabra | H04W 12/10 |
| 2022/0337271 | A1* | 10/2022 | Hanna | G06F 11/1048 |
| 2023/0119890 | A1* | 4/2023 | Villegas | G06F 21/64 |
| | | | | 726/23 |
| 2023/0280940 | A1* | 9/2023 | Del Gatto | G06F 3/0659 |

OTHER PUBLICATIONS

Patel, Minesh, et al. "A case for transparent reliability in DRAM systems." arXiv preprint arXiv:2204.10378 (2022). (Year: 2022).*
U.S. Appl. No. 17/831,433, filed Jun. 2, 2022, titled "Write Command Execution for Data Protection and Recovery Schemes", 42 pages.

* cited by examiner

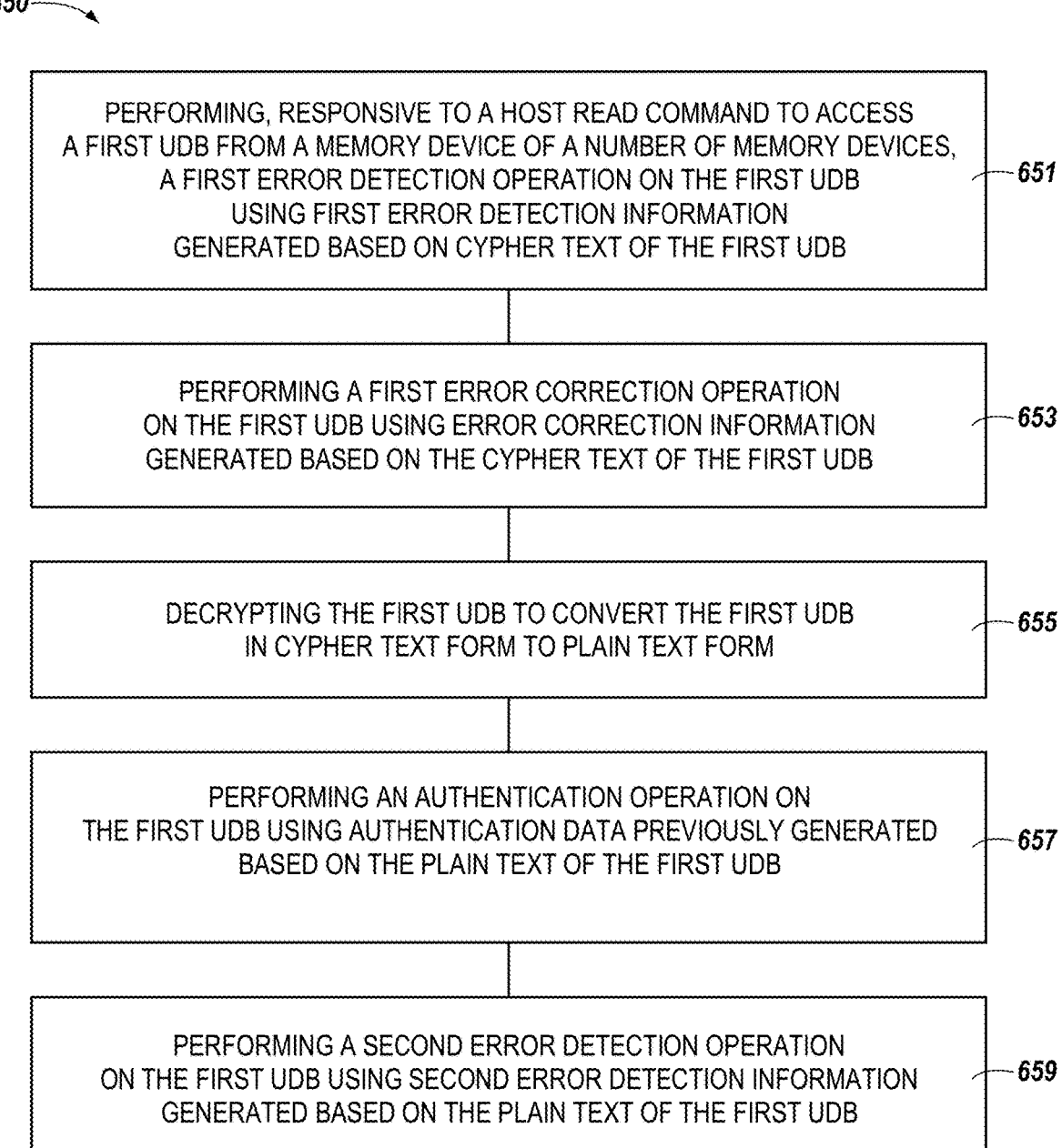

650

PERFORMING, RESPONSIVE TO A HOST READ COMMAND TO ACCESS
A FIRST UDB FROM A MEMORY DEVICE OF A NUMBER OF MEMORY DEVICES,
A FIRST ERROR DETECTION OPERATION ON THE FIRST UDB
USING FIRST ERROR DETECTION INFORMATION
GENERATED BASED ON CYPHER TEXT OF THE FIRST UDB  —651

PERFORMING A FIRST ERROR CORRECTION OPERATION
ON THE FIRST UDB USING ERROR CORRECTION INFORMATION
GENERATED BASED ON THE CYPHER TEXT OF THE FIRST UDB  —653

DECRYPTING THE FIRST UDB TO CONVERT THE FIRST UDB
IN CYPHER TEXT FORM TO PLAIN TEXT FORM  —655

PERFORMING AN AUTHENTICATION OPERATION ON
THE FIRST UDB USING AUTHENTICATION DATA PREVIOUSLY GENERATED
BASED ON THE PLAIN TEXT OF THE FIRST UDB  —657

PERFORMING A SECOND ERROR DETECTION OPERATION
ON THE FIRST UDB USING SECOND ERROR DETECTION INFORMATION
GENERATED BASED ON THE PLAIN TEXT OF THE FIRST UDB  —659

*FIG. 6*

NON-CACHED DATA TRANSFER

PRIORITY INFORMATION

This application claims the benefit of U.S. Provisional Application No. 63/357,516, filed on Jun. 30, 2022, the contents of which are incorporated herein by reference.

TECHNICAL FIELD

The present disclosure relates generally to semiconductor memory and methods, and more particularly, to apparatuses, systems, and methods related to non-cached data transfer.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

BRIEF DESCRIPTION OF THE DRAWINGS

FIG. 6 is a flow diagram of a method for non-cached data transfer in accordance with a number of embodiments of the present disclosure.

DETAILED DESCRIPTION

Figure 1:
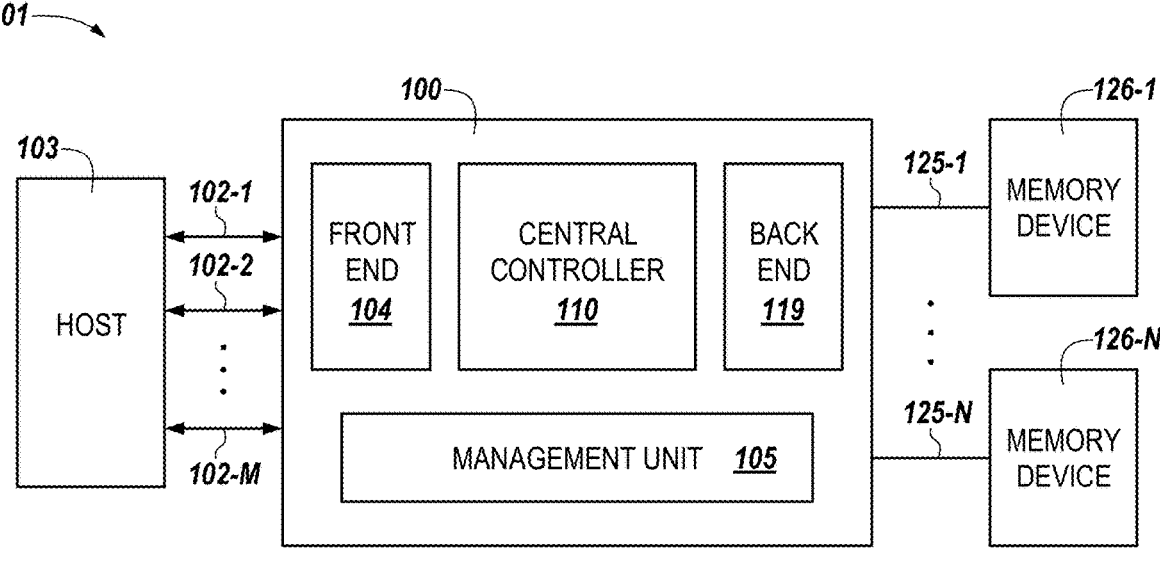
FIG. 1 is a functional block diagram of a computing system including a memory controller in accordance with a number of embodiments of the present disclosure.

Systems, apparatuses, and methods related to non-cached data transfer. In embodiments of the present disclosure, a memory controller operates without utilizing a cache, which eliminates a need to have a cache memory in the memory controller. Despite that data received at the memory controller is transferred without being cached, the memory controller of the embodiments is still capable of adding authentication, data security, and/or strengthened error detection capabilities to be compliant with various requirements/protocols, such as trusted execution engine security protocol (TSP).

In some embodiments, the error detection capabilities (e.g., using cyclic redundancy code (CRC)) can be provided at various levels of the memory system. In one example, the error detection capability can be provided at a cache line-level to ensure the reliability of data communicated between the memory controller and the memory devices. In another example, the error detection capability can be provided at a host access request-level (e.g., read and/or write commands) to ensure the reliability of data communicated between the memory controller and a host.

In some embodiments, the authentication capabilities can be provided to the memory system using various authentication schemes, such as message authentication code (MAC), although embodiments are not so limited. MAC can detect whether there have been any undesired changes in message content (e.g., MAC-protected data) as originally transferred from an authenticated sender. If the change is detected, the MAC triggers uncorrectable error(s) (alternatively referred to as "poison") and a receiver is notified of the detection. Accordingly, an attacker may only have a 1-in-2^n chance of escaping the detection with n-bit MAC (e.g., 1-in-2^28 chance with 28-bit MAC).

The authentication code can be efficient against various attacks, particularly against row hammer attacks. Row hammer attacks generally refer to security exploits that take advantage of an unintended and undesirable side effect in which memory cells interact electrically between themselves by leaking their charges, possibly changing the contents of nearby memory rows that were not addressed in the original memory access.

Protecting a memory system against row hammer attacks by using a MAC can reduce an attacker's probability of success (e.g., successfully escaping the detection provided by MAC), and can take a substantially long time to successfully corrupt the victim data even if the attacker is assumed to be able to perform brute-force attacks (e.g., infinite number of attempts) on the MAC-protected memory system. For example, if each attempt (being a Bernoulli trial) for row hammer attacks takes 40 microseconds, it can take up to 2.8 hours (e.g., 40 microseconds*2^28=2.8 hours) to corrupt the victim data of the memory system protected by 28-bit MAC, which provides sufficient time for a host and/or an owner of the memory system to respond.

In some embodiments, the authentication capabilities are provided in parallel with data security schemes, which can often be provided in the form of cryptographic encryption/decryption, such as an advanced encryption standard (AES) algorithm. Therefore, the authentication capabilities and the data security schemes can operate as complementary to each other.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 102-1, 102-2, 102-M in FIG. 1. Such analogous elements may be generally referenced without the hyphen and extra numeral or letter. For example, elements 102-1, 102-2, 102-M may be collectively referenced as elements 102. As used herein, the designators "M" and "N", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a functional block diagram of a computing system 101 including a memory controller 100 in accordance with a number of embodiments of the present disclosure. The memory controller 100 can include a front end portion 104, a central controller portion 110, and a back end portion 119. The computing system 101 can include a host 103 and memory devices 126-1, . . . , 126-N coupled to the memory controller 100.

The front end portion 104 includes an interface and interface management circuitry to couple the memory controller 100 to the host 103 through input/output (I/O) lanes 102-1, 102-2, . . . , 102-M and circuitry to manage the I/O lanes 102. There can be any quantity of I/O lanes 102, such as eight, sixteen, or another quantity of I/O lanes 102. In some embodiments, the I/O lanes 102 can be configured as a single port.

In some embodiments, the memory controller 100 can be a compute express link (CXL) compliant memory controller. The host interface (e.g., the front end portion 104) can be managed with CXL protocols and be coupled to the host 103 via an interface configured for a peripheral component interconnect express (PCIe) protocol. CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. As an example, the interface of the front end 104 can be a PCIe 5.0 or 6.0 interface coupled to the I/O lanes 102. In some embodiments, the memory controller 100 can receive access requests involving the memory device 226 via the PCIe 5.0 or 6.0 interface 206 according to a CXL protocol.

The central controller portion 110 can include and/or be referred to as data management circuitry. The central controller portion 110 can control, in response to receiving a request from the host 103, performance of a memory operation. Examples of the memory operation include a read operation to read data from a memory device 126 or a write operation to write data to a memory device 126.

The central controller portion 110 can generate error detection information and/or error correction information based on data received from the host 103. The central controller portion 110 can perform error detection operations and/or error correction operations on data received from the host 103 or from the memory devices 126.

As used herein, the term "error correction information" refers to information that can be used to correct a number of errors within data. More particularly, the error correction information can identify which bit of the data corresponds to an "error" (e.g., needs to be error-corrected). Further, as used herein, the term "error correction operation" refers to an operation to correct one or more errors within data. In a number of embodiments, the error correction operation can be performed using the error correction information.

As used herein, the term "error detection information" refers to information that can be used to indicate whether data has one or more errors or not, which may not further indicate which bit position of the data needs to be error-corrected. Further, as used herein, the term "error detection operation" refers to an operation to indicate whether data has one or more errors. In a number of embodiments, the error detection operation can be performed using the error detection information; therefore, the error detection operation performed on the data may not precisely indicate which bit of the data needs to be error-corrected.

An example of an error detection operation is a cyclic redundancy check (CRC) operation. CRC may be referred to as algebraic error detection. CRC can include the use of a check value resulting from an algebraic calculation using the data to be protected. CRC can detect accidental changes to data by comparing a check value stored in association with the data to the check value calculated based on the data.

An error correction operation can be performed to provide error correction capabilities with various granularities. In one example, an error correction operation, when performed (e.g., at the ECC decoders 216-2 and/or 316-2 as illustrated in FIGS. 2 and 3, respectively), can provide an error correction capability of correcting a particular quantity of (e.g., bit) errors, while further providing an error detection capability of detecting errors (without correcting those) beyond the particular quantity. While this error correction capability may not be capable of protecting a memory die of a memory device 126 from its complete failure, another error correction operation, such as a chip kill operation, can provide an error correction capability to restore the memory die despite of its complete failure.

A chip kill operation protects the memory system even if a constituent memory component (e.g., a memory die) is damaged; thereby, avoiding a situation of one of the memory components being a single point of failure (SPOF) of the memory system. Often, the chip kill capability is provided through various error correction code (ECC) schemes including a "Redundant Array of Independent Disks" (RAID) scheme, a low-power chip kill (LPCK) scheme, etc., which allow data recovery of the damaged chip by reading all of the constituent chips of the memory system.

The back end portion 119 can include a media controller and a physical (PHY) layer that couples the memory controller 100 to the memory devices 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can include channels 125-1, . . . , 125-N. The channels 125 can include various types of data buses, such as a sixteen-pin data bus and an four-pin data mask inversion (DMI) bus, among other possible buses.

The memory devices 126 can be various/different types of memory devices. For instance, the memory device can include RAM, ROM, DRAM, SDRAM, PCRAM, RRAM, and flash memory, among others. In embodiments in which the memory device 126 includes persistent or non-volatile memory, the memory device 126 can be flash memory devices such as NAND or NOR flash memory devices. Embodiments are not so limited, however, and the memory device 126 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a memory device with resistive, phase-change, or similar memory cells, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

In another example, the memory devices 126 can be dynamic random access memory (DRAM) operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). In at least one embodiment, at least one of the memory devices 126-1 is operated as an LPDDRx DRAM device with low-power features enabled and at least one of the memory devices 126-N is operated an LPDDRx DRAM device with at least one low-power feature disabled. In some embodiments, although the memory devices 126 are LPDDRx memory devices, the memory devices 126 do not include circuitry configured to provide low-power functionality for the memory devices 126 such as a dynamic voltage frequency scaling core (DVFSC), a sub-threshold current reduce circuit (SCRC), or other low-power functionality providing circuitry. Providing the LPDDRx memory devices 126 without such circuitry can advantageously reduce the cost, size, and/or complexity of the LPDDRx memory devices 126. By way of example, an LPDDRx memory device 126 with reduced low-power functionality providing circuitry can be used for applications other than mobile applications (e.g., if the memory is not intended to be used in a mobile application, some or all low-power functionality may be sacrificed for a reduction in the cost of producing the memory).

Data can be communicated between the back end portion 119 and the memory devices 126 in forms of a data block, such as a user data block (UDB) (e.g., 64 bytes). Alternatively speaking, An UDB can be a unit of data transfer between the memory controller 100 and one or more memory devices 126. As used herein, the term "UDB" refers to a data block containing host data (e.g., data received from the host 103 and alternatively referred to as user data). As further described herein, an UDB can also be a unit of host read/write access. For example, a host read/write command (e.g., a read/write command received from the host 103) can be in a granularity of an UDB. Accordingly, a data transfer unit (between the memory controller 100 and the memory devices 126) can correspond to a unit of host read/write access.

Along with an UDB, other "extra" bits of data (e.g., in addition to UDBs) can also be transferred between the back end portion 119 and the memory devices 126. The extra data can include data (e.g., error correction information) dedicated for correcting and/or detecting errors in the UDB and/or data (e.g., error detection information) dedicated for detecting errors in the UDB, although embodiments are not so limited.

An UDB can be associated with a parity data block (PDB). As used herein, the term "PDB" refers to a data block containing parity data (e.g., RAID parity in forms of one or more parity symbols) configured for a chip kill (e.g., LCPK and/or RAID) operation on one UDB associated with the PDB. A PDB and an UDB that share the same PDB can be together referred to as a stripe (e.g., LPCK and/or RAID stripe). In some embodiments, some (e.g., one or more) memory dices (e.g., of a memory device 126) can be dedicated for PDBs. For example, memory dices configured to store UDBs can be different from a memory dice (e.g., one or more memory dices) configured to store PDBs. A data block (e.g., UDB and/or PDB) can be transferred to/from (e.g., written to/read from) the memory dices via the channels 126 over a predefined burst length (e.g., a 16-bit BL) that the memory controller 100 operates with.

A burst is a series of data transfers over multiple cycles, such as beats. As used herein, the term "beat" refers to a clock cycle increment during which an amount of data equal to the width of the memory bus may be transmitted. For example, 32-bit burst length can be made up of 32 beats of data transfers. Although embodiments are not so limited, a bus width corresponding to a size of each beat can be 4 (e.g., alternatively referred to as "×4"), 8 (e.g., alternatively referred to as "×8"), and/or 16 bits (e.g., alternatively referred to as "×16").

In some embodiments, the memory controller 100 can include a management unit 105 to initialize, configure, and/or monitor characteristics of the memory controller 100. The management unit 105 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

FIG. 2 is a functional block diagram of a memory controller 200 having an LPCK encoder/decoder 214-1/214-2 in accordance with a number of embodiments of the present disclosure. The memory controller 200, the central controller portion 210, the back end portion 219, and the memory devices 226 illustrated in FIG. 2 are analogous to the memory controller 100, the central controller portion 110, the back end portion 119, and the memory devices 126 illustrated in FIG. 1.

The central controller portion 210 includes a front-end CRC ("FCRC") encoder 211-1 (e.g., paired with a FCRC decoder 211-2) to generate error detection information (e.g., alternatively referred to as end-to-end CRC (e2e CRC)) based on data (e.g., corresponding to an UDB and in "plain text" form) received as a part of a write command (e.g., received from the host 103). As used herein, an UDB in plain text form can be alternatively referred to as an "unencrypted UDB", which can be further interchangeably referred to as a "decrypted UDB" or an "unencrypted version of an UDB".

The error detection information generated at the FCRC encoder 211-1 can be a check value, such as CRC data. Read and write commands of CXL memory systems can be a size of UDB, such as 64 bytes. Accordingly, the data received at the FCRC encoder 211-1 can correspond to an UDB.

The central controller portion 210 further includes a security encoder 217-1 (e.g., paired with a security decoder 217-2) to encrypt data before transferring the data to a CRC encoder 213-1 (to write the data to the memory devices 226). Although embodiments are not so limited, the pair of security encoder/decoder 217 can operate using an AES encryption/decryption (e.g., algorithm). The encryption at the security encoder 217-1 can be referred to as conversion of plain text data (e.g., unencrypted data) into cypher text data (e.g., encrypted data). As used herein, the UDB in cypher text form can be alternatively referred to as an "encrypted UDB", which can be alternatively referred to as an "encrypted version of an UDB". The central controller portion 210 further includes an authenticity/integrity encoder 218-1 to generate authentication data based on data received from the cache 212. Although embodiments are not so limited, the authentication data generated at the authenticity/integrity encoder 218-1 can be MAC, such as KEC-CAK MAC (KMAC) (e.g., SHA-3-256 MAC).

In some embodiments, the MAC generated at the authenticity/integrity check encoder 218-1 can be calculated based on trusted execution environment (TEE) data (alternatively referred to as "TEE flag"), Host Physical Address (HPA)

(e.g., a memory address used/identified by the host 103 illustrated in FIG. 1 in association with host read/write transactions), a security key identifier (ID) that are associated with a physical address (of the memory devices 226) to be accessed for executing a host write command.

The security encoder 217-1 and the authenticity/integrity encoder 218-1 can operate in parallel. For example, data (e.g., UDB) received from the host (e.g., the host 103 illustrated in FIG. 1) and that are in plain text form can be also input (e.g., transferred) to both the security encoder 217-1 and the authenticity/integrity encoder 218-1. Further, in some embodiments, a security key ID, TEE flag, and an HPA associated with a host write command can be further input (along with the data in plain text form) to the authenticity/integrity check encoder 218-1.

The central controller portion 210 includes a CRC encoder 213-1 (e.g., paired with a CRC decoder 213-2) to generate error detection information (e.g., alternatively referred to as cache line CRC (CL CRC)) based on data (e.g., UDB corresponding to a host write command) received from the security encoder 217-1. The data transferred to the CRC encoder 213-1 from the security encoder 217-1 can be in cypher text form as the data were previously encrypted at the security encoder 217-1. The error detection information generated at the error detection information generator 213-1 can be a check value, such as CRC data. The CRC encoder 213-1 and CRC decoder 213-2 can operate on data (e.g., MTB) having a size equal to or greater than a cache line size.

The central controller portion 210 includes low-power chip kill (LPCK) encoder 214-1 (e.g., paired with an LPCK decoder 214-2) to generate and/or update LPCK parity data (e.g., a PDB) based on data (e.g., UDB corresponding to a host write command) received from the CRC encoder 213-1. The data transferred to the LPCK encoder 214-1 from the CRC encoder 213-1 can be in cypher text form as the data were encrypted at the security encoder 217-1. The LPCK encoder 214-1 can update the PDB to conform to new UDB received as part of a write command from the host. The PDB is updated based on comparison (e.g., one or more XOR operations) among subsets of UDB (to be stored in respective different memory dice). In some embodiments, the MTB (including not only the updated PDB and the new UDB, but also the other UDBs that are not "new") can be transferred to the memory devices 226 to be rewritten entirely. In some embodiments, only a portion of the MTB that are subject to changes (e.g., the updated PDB and the new UDB) can be transferred to the memory devices 226 to be written, which eliminates a need to performance of a read-modify-write of the whole MTB to the memory devices 226; thereby, reducing a power associated with writing the updated PDB and the new UDB.

As shown in FIG. 2, the central controller portion 210 can include ECC encoders 216-1-1, . . . , 216-1-N configured to generate ECC data based on data (e.g., an UDB corresponding to a host write command) transferred from the LPCK encoder 214-1. The data transferred to each ECC encoder 216-1 can be in cypher text form as the data were previously encrypted at the security encoder 217-1.

Each ECC encoder 216-1 can be responsible for a respective region of the memory devices 226, such as a memory die, although embodiments are not so limited. As an example, if there are five memory devices 226 with each including two memory dice, the memory controller 200 can include ten ECC encoders 216-1 (as well as ten ECC decoders 216-2) such that ECC data generated at each of the ten ECC encoders 216-1 can be written (e.g., along with user data used to generate the ECC data) to a respective memory die.

Each ECC encoder 216-1 can be paired with a respective one of ECC decoders 216-2-1, . . . , 216-2-N to operate in a collective manner and to be dedicated for each memory device 216. For example, an ECC encoder 216-1-1 that can be responsible for the memory device 226-1 can be paired with an ECC decoder 216-2-1 that is also responsible for the memory device 226-1, which allows ECC data that were generated at the ECC encoder 216-1-1 and are to be later transferred to the ECC decoder 216-2-1 to be stored in the memory device 226-1.

"Extra" bits of data can be transferred (along with the UDB) to the back end portion 219 to be ultimately transferred and written to the memory devices 226. The "extra" bits can include LPCK parity data (e.g., in forms of a PDB) generated at the LPCK encoder 214-1, error detection information (e.g., CRC data) generated at the FCRC encoder 211-1 and/or 213-1, error correction information (e.g., alternatively referred to as ECC data) generated at the ECC encoders 216-1, and/or authentication data (e.g., MAC data) generated at the authenticity/integrity encoder 218-1 that are associated with the UDB as well as metadata and/or TEE data.

As shown in FIG. 2, the memory controller 200 can include a back end portion 219 coupled to the central controller portion 210. The back end portion 219 can include media controllers 221-1, . . . , 221-N. The back end portion 219 can include PHY memory interfaces 224-1, . . . , 224-N. Each physical interface 224 is configured to be coupled to a respective memory device 226.

The media controllers 221-1, . . . , 221-N can be used substantially simultaneously to drive the channels 225-1, . . . , 225-N simultaneously. In at least one embodiment, each of the media controllers 221 can receive a same command and address and drive the channels 225 substantially simultaneously. By using the same command and address, each of the media controllers 221 can utilize the channels 225 to perform the same memory operation on the same memory cells. As described further below, the channels 225 can comprise a number of separate data protection channels (alternatively referred to as RAS (Reliability, Availability, and Serviceability) channel), which can each comprise a number of memory devices (e.g., dice) 226 accessed together in association with a particular data protection scheme (e.g., RAID, LPCK, etc.). The data protection channels can include LPCK and/or RAID channels. As used herein, the term "LPCK channel" refers to one or more channels (e.g., channels 125, 225, and/or 325 illustrated in FIGS. 1, 2A, 2B, 3A, and 3B, respectively) that are accessed together for LPCK access. Alternatively speaking, an LPCK channel can be an access unit for transfer of a single LPCK stripe. As used herein, the term "RAID channel" refers to one or more channels (e.g., channels 125, 225, and/or 325 illustrated in FIGS. 1, 2A, 2B, 3A, and 3B, respectively) that are accessed together for RAID access. Alternatively speaking, an RAID channel can be an access unit for transfer of a single RAID stripe. As one example, the channels 225 might comprise four separate data protection channels 225 each comprising ten memory devices 226. Embodiments are not limited to a particular number of channels 225 or to a particular number of memory devices 226 per channel.

As used herein, the term "substantially" means that the characteristic need not be absolute, but is close enough so as to achieve the advantages of the characteristic. For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the memory controllers can be utilized such that they are writing data to the memory devices at the same time regardless of whether one of the media controllers commences or terminates prior to the other.

In some embodiments, PHY memory interfaces 224 can be an LPDDRx memory interface. In some embodiments, each of the PHY memory interfaces 224 can include data and DMI pins. For example, each PHY memory interface 224 can include sixteen data pins and four DMI pins. The media controllers 211 can operate in conjunction with the PHY memory interfaces to exchange data with a respective memory device 226 via the data pins. The media controllers 221 can be configured to exchange error correction information, error detection information, and or metadata via the DMI pins as opposed to exchanging such information via the data pins. The DMI pins can serve multiple functions, such as data mask, data bus inversion, and parity for read operations by setting a mode register. The DMI bus uses a bidirectional signal. In some instances, each transferred byte of data has a corresponding signal sent via the DMI pins for selection of the data. In at least one embodiment, the data can be exchanged simultaneously with the error correction information and/or the error detection information. For example, 64 bytes of data (e.g., UDB) can be exchanged (transmitted or received) via the data pins (e.g., DQs) while 128 bits of the extra bits are exchanged via one or more DMI pins. Such embodiments reduce what would otherwise be overhead on the data input/output (e.g., also referred to in the art as a "DQ") bus for transferring error correction information, error detection information, and/or metadata.

The back end portion 219 can couple the PHY memory interfaces 224 to respective memory devices 226-1, 226-2, . . . , 226-(N–1), 226-N. The memory devices 226 each include at least one array of memory cells. In some embodiments, the memory devices 226 can be different types of memory. The media controllers 221 can be configured to control at least two different types of memory. For example, the memory devices 226-1, 226-2 can be LPDDRx memory operated according to a first protocol and the memory devices 226-(N–1), 226-N can be LPDDRx memory operated according to a second protocol different from the first protocol. In such an example, the first media controller 221-1 can be configured to control a first subset of the memory devices 226-1 according to the first protocol and the second media controller 221-N can be configured to control a second subset of the memory devices 226-N according to the second protocol.

Data (e.g., an UDB) stored in the memory devices 226 can be transferred to the back end portion 219 to be ultimately transferred and written to the cache 212 and/or transferred to the host (e.g., the host 103 illustrated in FIG. 1). In some embodiments, the data are transferred in response to a host read command (e.g., a read command received from the host 103 illustrated in FIG. 1) to access the UDB.

Along with an UDB, other "extra" bits of data can be transferred to the back end portion 219 as well. The "extra" bits can include LPCK parity data generated at the LPCK 214-1 (e.g., in forms of a PDB), error detection information generated at the FCRC encoder 211-1 and/or 213-1, parity data (e.g., symbols) generated at the LPCK encoder 214-1, ECC data generated at the ECC encoders 216-1, and authentication data generated at the authenticity/integrity encoder 218-1 that are associated with the UDB as well as metadata and/or TEE data. As described herein, the UDB transferred to the back end portion 219 can be in cypher text form.

Data (e.g., an UDB corresponding to a host read command) transferred to the back end portion 219 can be further transferred to the respective ECC decoders 216-2. At each ECC decoder 216-2, an error correction operation can be performed on the UDB to correct error(s) up to a particular quantity and detect errors beyond particular quantity without correcting those. In one example, each ECC decoder 216-2 can use the error correction information to either correct a single error without detecting capabilities, which is referred to as a single error correction (SEC) operation. In another example, each ECC decoder 216-2 can use the error correction information to either correct a single error or detect two errors (without correcting two errors), which is referred to as a single error correction and double error detection (SECDED) operation. In a different example, each ECC decoder 216-2 can use the error correction information (e.g., alternatively referred to as ECC data) to either correct a two error or detect three errors (without correcting three errors), which is referred to as a double error correction and triple error detection (DECTED) operation.

As described herein, each ECC decoder 216-2 can also be responsible for a respective memory device 226 as the paired ECC encoder 216-1 is. For example, if the ECC decoder 216-2-1 is responsible for the memory device 226-1, the ECC data and the UDBs stored in the memory device 226-1 can be transferred to the ECC decoder 216-2-1. In some embodiments, pairs of ECC encoder/decoder 216 can be selectively enabled/disabled. When disabled, an UDB can be transferred to the memory device 226 without generating error correction information (e.g., alternatively referred to as "ECC data") and to the memory controller 200 without correcting one or more errors using the ECC decoder 216.

Subsequent to error correction operations performed respectively at the ECC decoders 216-2, the UDB can be further transferred to the LPCK decoder 214-2 along with a corresponding PDB (generated at the LPCK encoder 214-1). At the LPCK decoder 214-2, the LPCK parity data can be used to perform a chip kill operation (e.g., an LPCK operation) on the UDB received from the memory devices 226.

An example chip kill implementation for a memory controller 200 can include writing an UDB (including user data symbols) to eight memory dice of a memory device 226 and an PDB (including parity data symbols) to two memory dice of the memory device 226. In this example, four codewords can be written, each composed of ten four-bit (or eight-bit) symbols, with each symbol belonging to a different memory die of the memory device 226. A first codeword can comprise the first four-bit symbol of each memory device 226, a second codeword can comprise the second four-bit symbol of each memory device 226, a third codeword can comprise the third four-bit symbol of each memory device 226, and a fourth codeword can comprise the fourth four-bit symbol of each memory die of the memory device 226. The two parity symbols can allow the LPCK circuitry 214 to correct up to one symbol error in each codeword, which can recover one memory die from its (e.g., complete) failure and avoid the memory die being a SPOF.

A multibit symbol can be a non-binary symbol. For example, non-binary symbol(s) having N bits can be one of $2^N$ elements of a finite Galois field. As used herein, a multibit symbol and a non-binary symbol are used interchangeably here and can have the same meaning, as appropriate to the context.

In some embodiments, the user data symbols and the parity symbol(s) of the UDB can be written or read simultaneously from the memory dice of the memory device 226. If every bit symbol in one memory die of the memory device 226 fails, only the bit symbols from that memory die in the codeword will fail. This allows memory contents to be reconstructed despite the complete failure of one memory die.

Figure 3A:
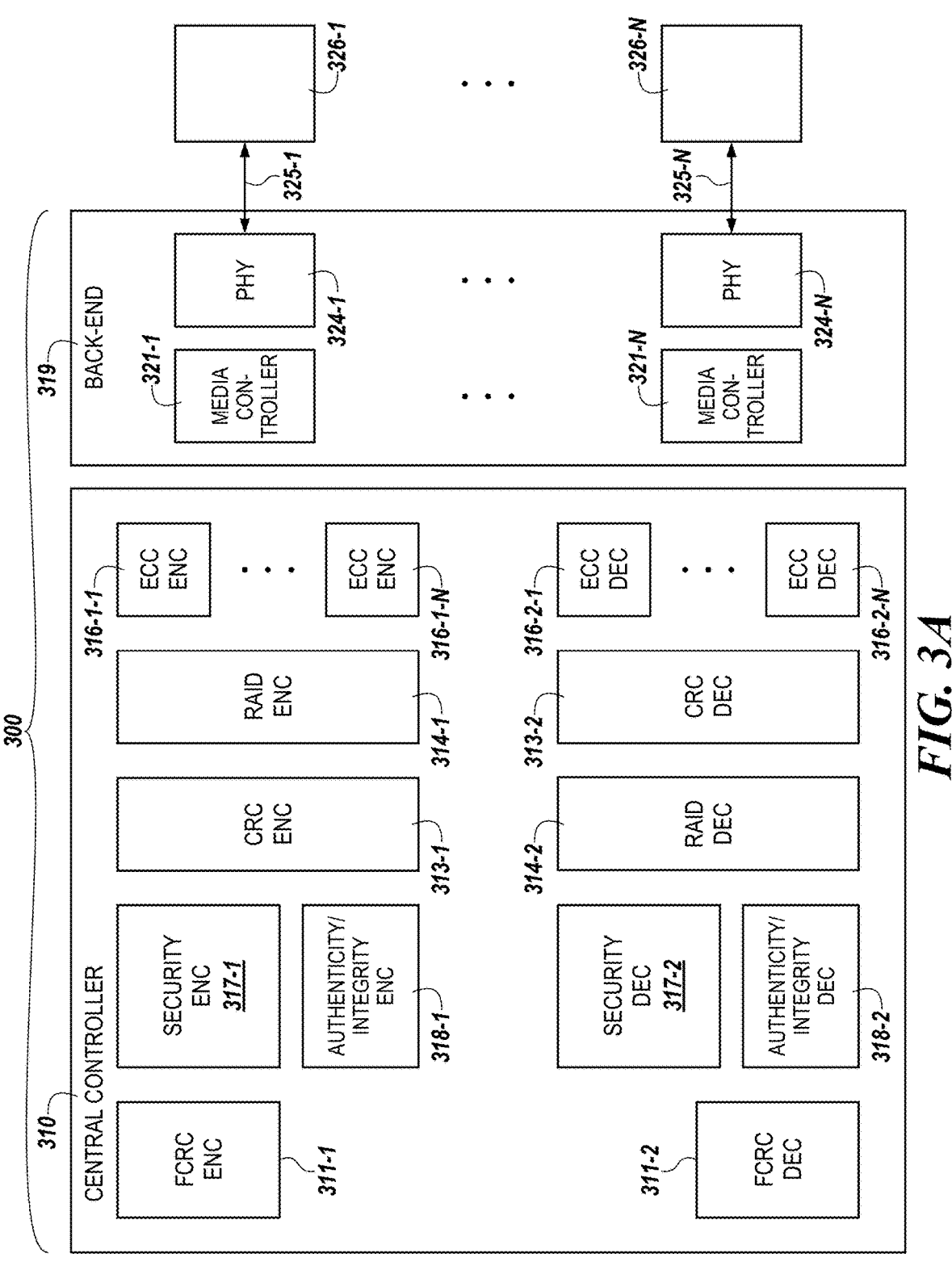
FIG. 3A is a functional block diagram of a memory controller having a redundant array of independent disks (RAID) encoder/decoder in accordance with a number of embodiments of the present disclosure.
Figure 3B:
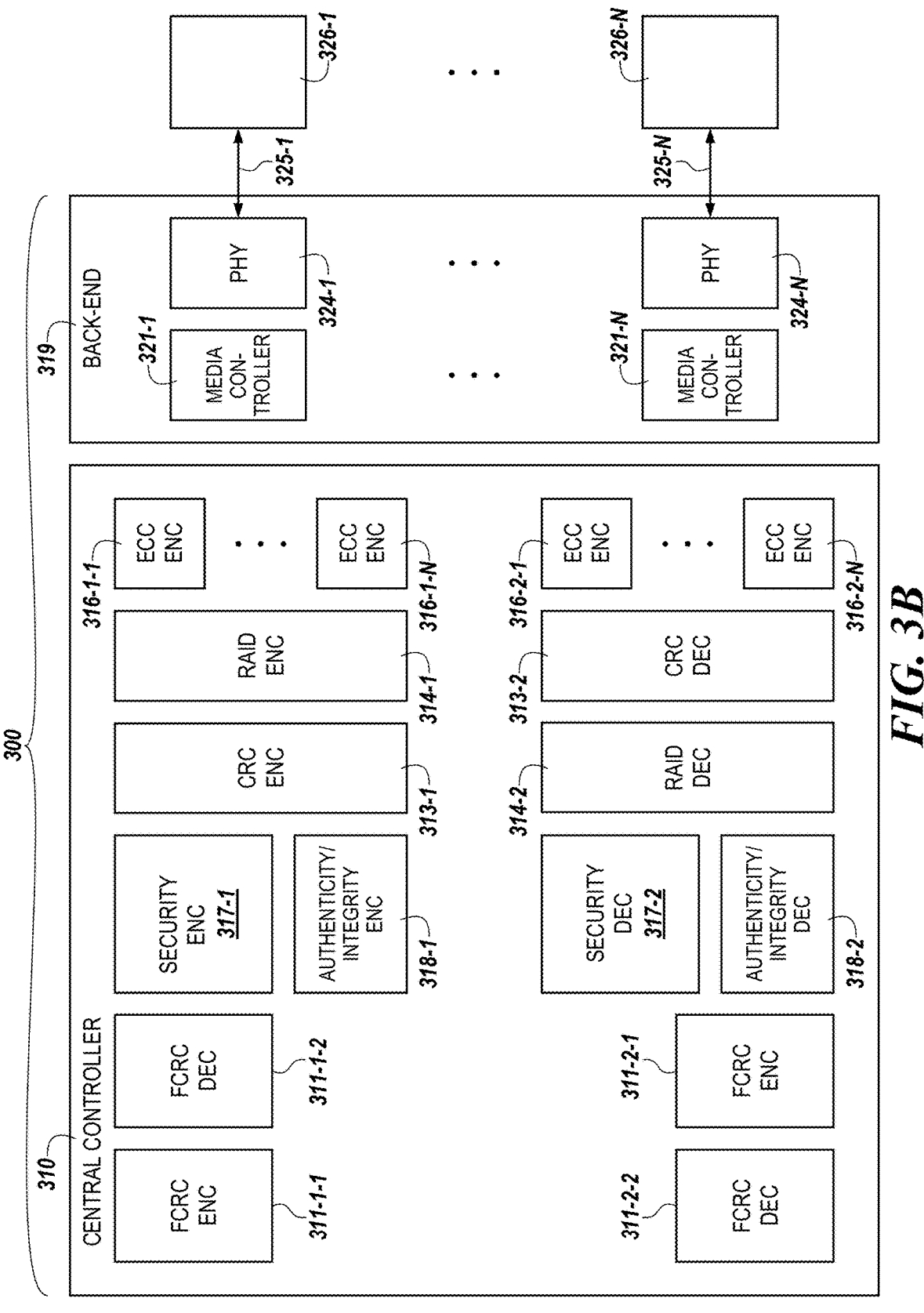
FIG. 3B is another functional block diagram of a memory controller having a RAID encoder/decoder in accordance with a number of embodiments of the present disclosure.

LPCK is considered to be "on-the-fly correction" because the data is corrected without impacting performance by performing a repair operation (e.g., chip kill operation). For example, the PDB is transferred along with the UDB (e.g., from the memory dice of the memory device 226 to the memory controller 200) along with the UDB, which eliminates a need to separately transfer the PDB when a chip kill operation is needed, which, therefore, does not impact performance in performing the chip kill operation. The LPCK encoder 214-1 and/or the decoder 214-2 can include combinational logic that uses a feedforward process. In contrast, a redundant array of independent disks (RAID), described in more detail with respect to FIGS. 3A and 3B, is considered to be "check-and-recover correction" because a repair process is initiated to recover data subject to an error. The LPCK encoder 214-1 and/or decoder 214-2 can include combinational logic that uses a feedforward process.

Subsequent to an LPCK operation performed at the LPCK decoder 214-2, the UDB can be further transferred to the CRC decoder 213-2 along with at least the error detection information previously generated at the CRC encoder 213-1. At the CRC decoder 213-2, an error detection operation can be performed to detect any errors in the UDB using the error detection information, such as CRC data.

Subsequent to an error detection operation performed at the CRC decoder 213-2, the UDB can be further transferred to the security decoder 217-2 and to the authenticity/integrity decoder 218-2 along with at least the authentication data previously generated at the authenticity/integrity encoder 218-1. At the security decoder 217-2, the data (e.g., UDB) can be decrypted (e.g., converted from the cypher text back to the plain text as originally received from the host). The security decoder 217-2 can use an AES decryption to decrypt the data.

At the authenticity/integrity decoder 218-2, the data that were decrypted at the security decoder 217-2 can be authenticated using the authentication data (e.g., MAC) that were previously generated at the authenticity/integrity encoder 218-1. In some embodiments, the authenticity/integrity check decoder 218-2 can calculate MAC based on TEE data, HPA, and the security key ID associated with a physical address to be accessed for executing a host read command. The MAC that is calculated during the read operation can be compared to the MAC transferred from (a location corresponding to the physical address of) the memory devices 226. If the calculated MAC and transferred MAC match, the UDB is written to the cache 212 (and further transferred to the host if needed). If the calculated MAC and transferred MAC do not match, the host is notified of the mismatch (and/or the poison).

The data (e.g., UDB) authenticated at the authenticity/integrity decoder 218-2 and decrypted at the security decoder 217-2 can be transferred to the FCRC decoder 211-2. At the FCRC decoder 211-2, data (e.g., UDB) can be checked for any errors using CRC data that were previously generated at the FCRC encoder 211-1. The data decrypted at the FCRC decoder 211-2 can be further transferred to the host.

Figure 2A:
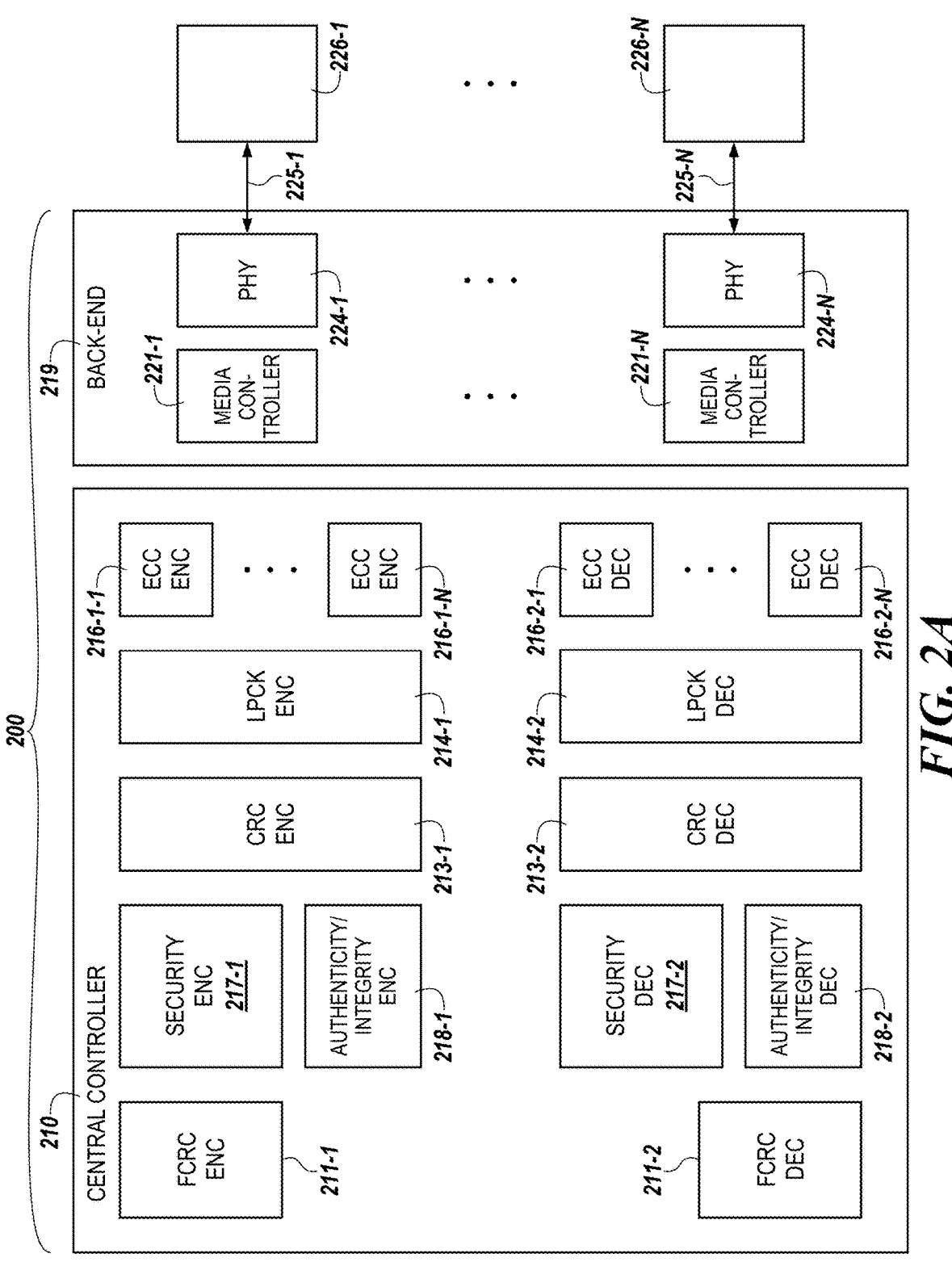
FIG. 2A is a functional block diagram of a memory controller having an low-power chip kill (LPCK) encoder/decoder in accordance with a number of embodiments of the present disclosure.
Figure 2B:
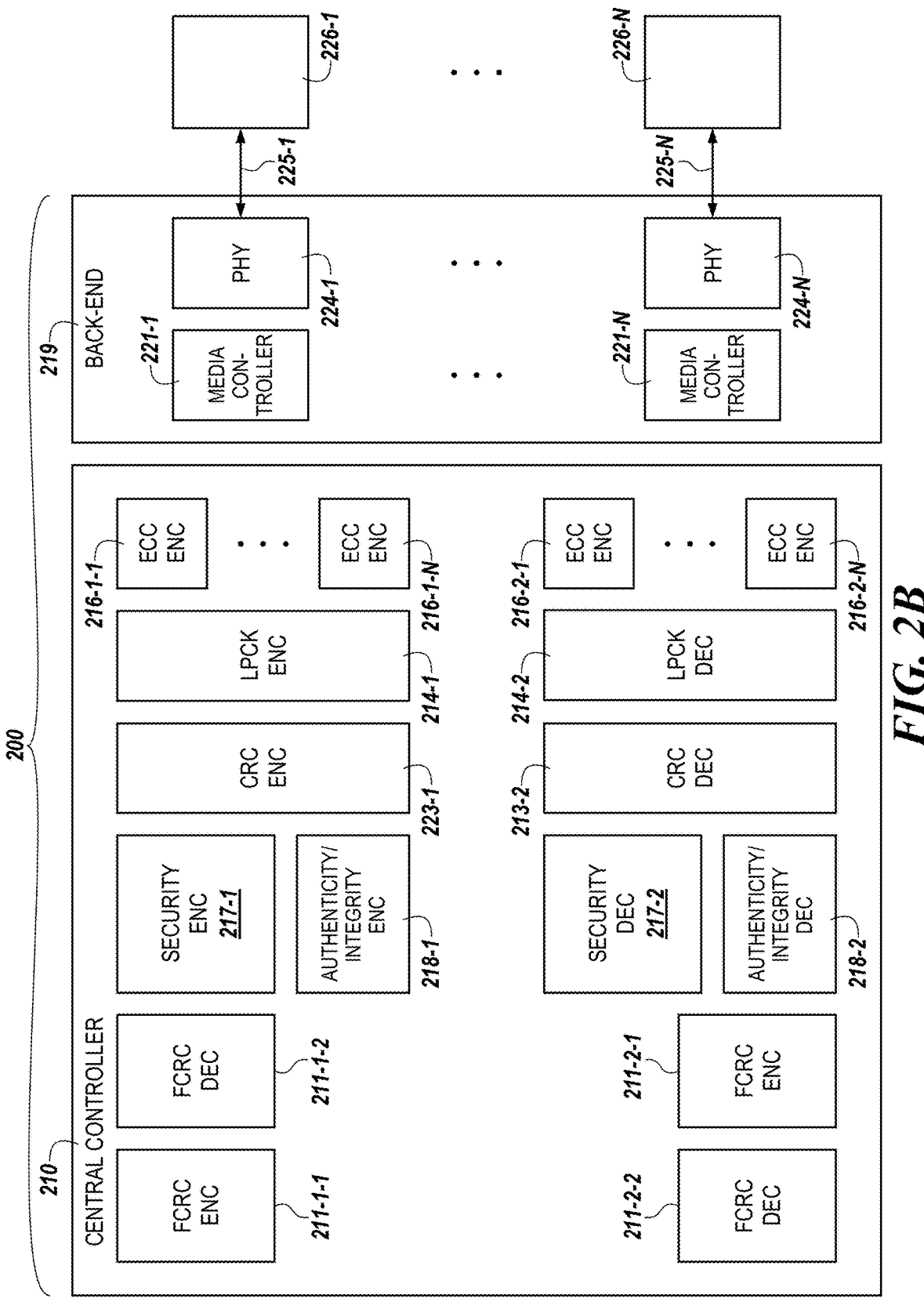
FIG. 2B is another functional block diagram of a memory controller having an LPCK encoder/decoder in accordance with a number of embodiments of the present disclosure.

FIG. 2B is another functional block diagram of a memory controller 200 having an LPCK encoder/decoder 214-1/214-2 in accordance with a number of embodiments of the present disclosure. The memory controller 200, the central controller portion 210, the back end portion 219, and the memory devices 226 illustrated in FIG. 2B are analogous to the memory controller 100, the central controller portion 110 the back end portion 119, and the memory devices 126 illustrated in FIG. 1.

The memory controller 200 can include a central controller portion 310 and a back end portion 219. The central controller portion 210 can include a FCRC encoder 211-1-1 paired with a FCRC decoder 211-1-2 and a FCRC encoder 211-2-1 paired with a FCRC decoder 211-2-2, the security encoder 217-1 paired with the security decoder 217-2, the authenticity/integrity encoder 218-1 paired with the authenticity/integrity decoder 218-2, the CRC encoder 213-1 paired with the CRC decoder 213-2, the LPCK encoder 214-1 paired with the LPCK decoder 214-2, and the ECC encoders 216-1-1, . . . , 216-1-N respectively paired with the ECC decoders 216-2-1, . . . , 216-2-N. A pair of security encoder/decoder 217, a pair of authenticity/integrity encoder/decoder 218, a pair of CRC encoder/decoder 213, a pair of LPCK 214, respective pairs of ECC encoder/decoder 216 illustrated in FIG. 2B can be analogous to a pair of security encoder/decoder 217, a pair of authenticity/integrity encoder/decoder 218, a pair of CRC encoder/decoder 213, a pair of LPCK encoder/decoder 214, respective pairs of ECC encoder/decoder 216, as illustrated in FIG. 2A. The back end portion 219 can include media controllers 221-1, . . . , 221-N and PHY memory interfaces 224-1, . . . , 224-N configured to be coupled to memory devices 226-1, . . . , 226-N via channels 225-1, . . . , 225-N.

FIG. 2B is analogous to FIG. 2A, except that it includes additional circuitry to check any errors on the UDB using CRC data without transferring/storing the CRC data to the memory device 226. For example, as illustrated in FIG. 2B, the FCRC decoder 211-1-2 can be configured to check any errors on an UDB received from the FCRC encoder 211-1 using error detection information (e.g., CRC data) generated at the FCRC encoder 211-1-1. The FCRC encoder 211-2-1 can be configured generate error detection information (e.g., CRC data) on an UDB to be transferred to the host (e.g., the host 103 illustrated in FIG. 1). The error detection information generated at the FCRC encoder 211-2-1 can be used at the FCRC decoder 211-2-2 to check any errors on an UDB to be transferred to the host. Accordingly, the pairs of FCRC encoder/decoder 211-1 and 211-2 can be used just to check errors on data without being transferred and written to the memory devices 226.

FIG. 3A is a functional block diagram of a memory controller having a redundant array of independent disks (RAID) encoder/decoder 315-1/315-2 in accordance with a number of embodiments of the present disclosure. The memory controller 300, the central controller portion 310, the back end portion 319, and the memory devices 326 illustrated in FIG. 3 are analogous to the memory controller 100, the central controller portion 110 the back end portion 119, and the memory devices 126 illustrated in FIG. 1.

The memory controller 300 can include a central controller portion 310 and a back end portion 319. The central controller portion 310 can include a CRC encoder 311-1 paired with a CRC decoder 311-2, the security encoder 317-1 paired with the security decoder 317-2, the authenticity/integrity encoder 318-1 paired with the authenticity/integrity decoder 318-2, the CRC encoder 313-1 paired with the CRC decoder 313-2, the RAID encoder 315-1 paired with the RAID decoder 315-2, and the ECC encoders 316-1-1, . . . , 316-1-N respectively paired with the ECC decoders 316-2-1, . . . , 316-2-N. A pair of security encoder/decoder 317, a pair of authenticity/integrity encoder/decoder 318, a pair of CRC encoder/decoder 313, a pair of RAID encoder/decoder 315, respective pairs of ECC encoder/decoder 316 can be analogous to a pair of security encoder/decoder 217, a pair of authenticity/integrity encoder/decoder 218, a pair of CRC encoder/decoder 213, a pair of RAID 214, respective pairs of ECC encoder/decoder 216, as illustrated in FIG. 2. The back end portion 319 can include media controllers 321-1, . . . , 321-N and PHY memory interfaces 324-1, . . . , 324-N configured to be coupled to memory devices 326-1, . . . , 326-N via channels 325-1, . . . , 325-N.

FIG. 3A is analogous to FIG. 2A, except that it includes RAID encoder/decoder 315-1/315-2 located between the pair of CRC encoder/decoder 313 and the pair of security encoder/decoder 317 (or the pair of authenticity/integrity encoder/decoder 318) as compared to the LPCK encoder/decoder 214-1/214-2 illustrated in FIG. 2A and that are located respectively between the pair of CRC encoder/decoder 313 and the pair of ECC encoder/decoder 316.

The CRC decoder 313-2 can operate on data in conjunction with the RAID decoder 315-2 to provide check-and-recover correction. More specifically, the CRC decoder 313-2 can detect an error in data (e.g., received from the respective ECC decoder 316-2) and the RAID decoder 315-2 can recover the data in response. In at least one embodiment, the check-and-recover correction provided by the CRC decoder 313-2 and the RAID decoder 315-2 is supplemental to the error correction provided by the ECC decoder 316-2. For example, if data (e.g., UDBs corresponding to a cache line) transferred from the memory devices 226 has an error correctable by the ECC decoder 316-2, it can do so without further data recovery (e.g., one or more RAID operations) by the RAID decoder 315-2. However, if an error persists that is not correctable by the ECC decoder 316-2, then the data may be recoverable by the RAID decoder 315-2. As another example, an error may escape detection by the ECC decoder 316-2, but be detected by the CRC decoder 313-2. In such an example, the underlying data may be recoverable by the RAID decoder 315-2.

When the RAID process is triggered, the RAID operation performed on the UDB can recover a subset of the UDB that was transferred from one (e.g., failed) memory die based on the other subsets of the UDB transferred from the other memory dice. Since all the subsets (of the UDB) is collectively input (e.g., transferred) to the CRC decoder (e.g., the CRC decoder 313-2 illustrated in FIG. 3A) and collectively checked for one or more errors (alternatively referred to as "locked-RAID"), the CRC check performed at the CRC decoder may not indicate which subset has one or more errors. Therefore, the triggered RAID process involves a number of RAID operations that can be respectively and independently performed on each subset to correct the one subset that indeed has the errors. For example, considering an UDB is received from eight memory dice (e.g., memory dice 527-1 to 527-8 as illustrated in FIG. 5), eight RAID operations can be performed (e.g., in parallel) respectively on each subset (corresponding to each memory dice) of the UDB.

In some embodiments, the RAID decoder 315-2 can further include a CRC decoder that provides the same functionality as the CRC decoder 213-2, but to perform an error detection operation (e.g., to CRC-check) on data subsequent to each of the RAID operations. Continuing with the above example, the CRC check can be performed using the CRC decoder within the RAID decoder 315-2 on results of the eight RAID operations to determine which one of the RAID operations actually corrected the errors. One of the results (e.g., UDB with the errors corrected) can be further sent to the security decoder 317 and/or authentication decoder 318.

FIG. 3B is another functional block diagram of a memory controller having a RAID encoder/decoder 315-1/315-2 in accordance with a number of embodiments of the present disclosure. The memory controller 300, the central controller portion 310, the back end portion 319, and the memory devices 326 illustrated in FIG. 3B are analogous to the memory controller 100, the central controller portion 110 the back end portion 119, and the memory devices 126 illustrated in FIG. 1.

The memory controller 300 can include a central controller portion 310 and a back end portion 319. The central controller portion 310 can include a CRC encoder 311-1-1 paired with a CRC decoder 311-1-2 and a CRC encoder 311-2-1 paired with a CRC decoder 311-2-2, the security encoder 317-1 paired with the security decoder 317-2, the authenticity/integrity encoder 318-1 paired with the authenticity/integrity decoder 318-2, the CRC encoder 313-1 paired with the CRC decoder 313-2, the RAID encoder 315-1 paired with the RAID decoder 315-2, and the ECC encoders 316-1-1, . . . , 316-1-N respectively paired with the ECC decoders 316-2-1, . . . , 316-2-N. A pair of security encoder/decoder 317, a pair of authenticity/integrity encoder/decoder 318, a pair of CRC encoder/decoder 313, a pair of RAID encoder/decoder 315, respective pairs of ECC encoder/decoder 316 illustrated in FIG. 2B can be analogous to a pair of security encoder/decoder 317, a pair of authenticity/integrity encoder/decoder 318, a pair of CRC encoder/decoder 313, a pair of RAID 315, respective pairs of ECC encoder/decoder 316, as illustrated in FIG. 2A. The back end portion 319 can include media controllers 321-1, . . . , 321-N and PHY memory interfaces 324-1, . . . , 324-N configured to be coupled to memory devices 326-1, . . . , 326-N via channels 325-1, . . . , 325-N.

FIG. 3B is analogous to FIG. 3A, except that it includes additional circuitry to check any errors on the UDB using CRC data without transferring/storing the CRC data to the memory device 326. For example, as illustrated in FIG. 3B, The CRC decoder 311-1-2 can be configured to check any errors on an UDB received from the CRC encoder 311-1 using error detection information (e.g., CRC data) generated at the CRC encoder 311-1-1. The CRC encoder 311-2-1 can be configured generate error detection information (e.g., CRC data) on an UDB to be transferred to the host (e.g., the host 103 illustrated in FIG. 1). The error detection information generated at the CRC encoder 311-2-1 can be used at the CRC decoder 311-2-2 to check any errors on an UDB to be transferred to the host. Accordingly, the pairs of CRC encoder/decoder 311-1 and 311-2 can be used just to check errors on data without being transferred and written to the memory devices 326.

Figure 4A:
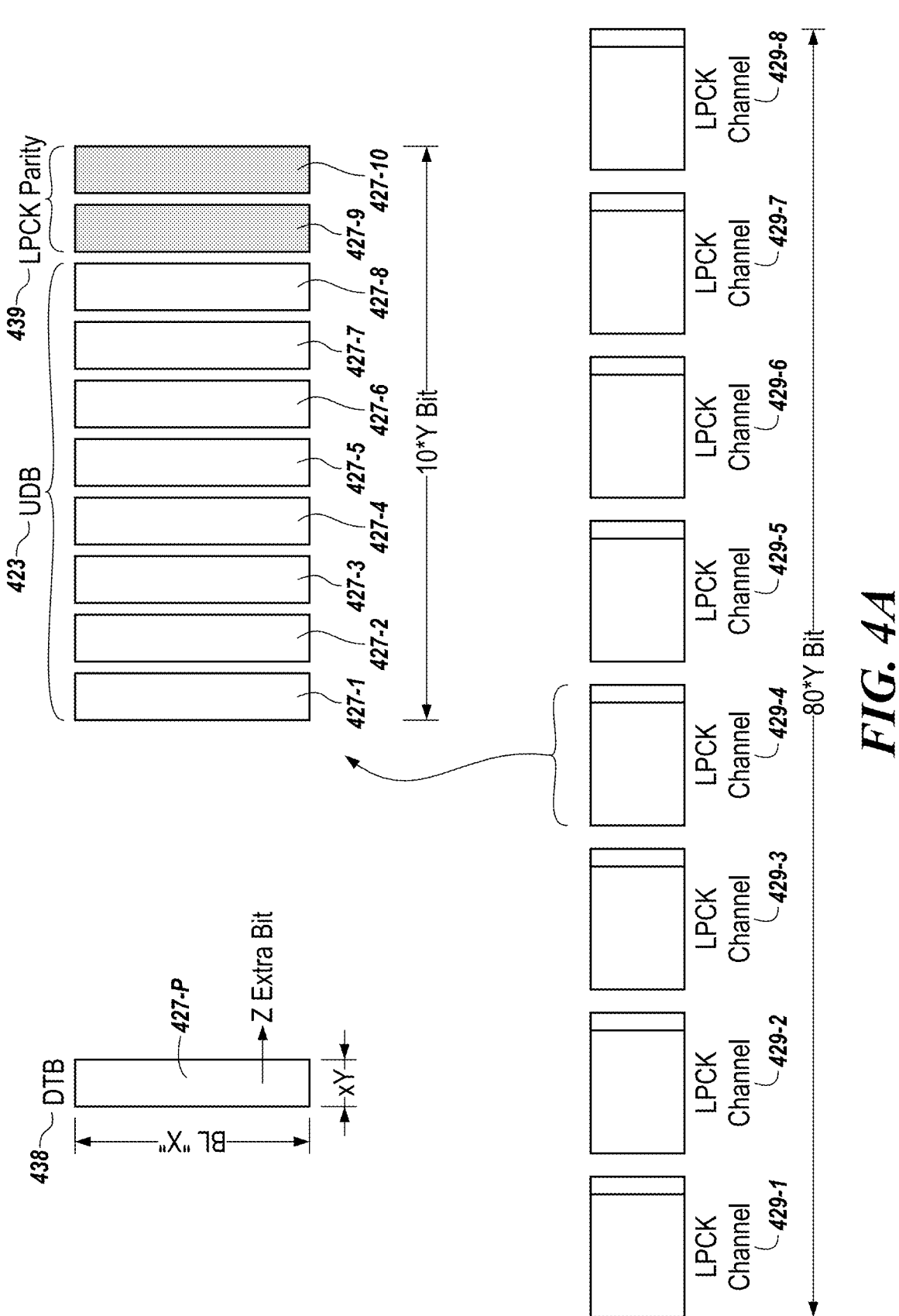
FIG. 4A is a block diagram of memory dice corresponding to one or more LPCK channels in accordance with a number of embodiments of the present disclosure.

FIG. 4A is a block diagram of memory dice corresponding to a number of LPCK channels (alternatively and generally referred to as data protection channels) in accordance with a number of embodiments of the present disclosure. An example memory die 427-P (which can be analogous to one or more memory dice illustrated in FIG. 4A) can be configured to store a die transfer block 438 ("DTB" as shown in FIG. 4A), which can be transferred from the memory die or to the memory controller (e.g., the memory controller 100 and/or 200 illustrated in FIGS. 1, 2A, and/or 2B, respectively) over a predefined burst length. For example, a DTB 438 can be transferred over X-bit burst length with Y-bit data transfer for each beat of the x-bit burst length, which transfers a total of Z-bit of extra data. More particular, a DTB 438 can be transferred over 16-bit burst length with 4-bit data transfer (e.g., ×4) for each beat of the 16-bit burst length, which transfers a total of 16-bit of extra data from each memory die, such as the memory die 427-P.

Although embodiments are not so limited, four memory dice 427 can correspond to (e.g., a channel width) of the channel 125, 225, and/or 325 illustrated in FIGS. 1 and 2, respectively. For example, memory dice 427-1, . . . , 427-4 can correspond to one channel 125, 225, 325; memory dice 427-6, . . . , 427-8 can correspond to another channel 125, 225, 325; and memory dice 427-9 and 427-10 can correspond to (a half of) a different channel 125, 225, 325. Accordingly, each channel 125, 225, 325 can be 4*Y-bit wide (e.g., 16-bit wide).

The diagram shows eight memory dice 427-1, . . . , 427-8 (of LPCK channel 429-5) over which an UDB 423 can be stored, although embodiments are not limited to a particular quantity of memory dice over which a single UDB can be stored. The diagram further shows two memory dice 427-9 and 427-10 over which a PDB including LPCK parity data 439 can be stored, although embodiments are not limited to a particular quantity of memory dice over which a PDB can be stored. In an example illustrated in FIG. 4A, eight memory dice (configured for an UDB 423) along with two memory dice (configured for a PDB 439) can be collectively referred to as an LPCK channel. Accordingly, 10*Y bits (e.g., 40 bits) can be transferred for each beat of the X-bit burst length. Although embodiments are not so limited, each memory die 427-1, . . . , 427-10 of the LPCK channel can correspond (e.g., be coupled) to a different channel (e.g., the channel 125 and/or 225 illustrated in FIGS. 1, 2A, and/or 2B, respectively), which allows the memory dice 427-1, . . . , 427-10 of the LPCK channel to be accessed simultaneously.

The computing system (e.g., the computing system 101 illustrated in FIG. 1) can include a number of LPCK channels, such as eight LPCK channels 429-1, . . . , 429-8 (which can transfer 80*Y bits, such as 320 bits, for each beat of the X-bit burst length) as illustrated in FIG. 4A, although embodiments are not limited to a particular quantity of LPCK channels the computing system can include. Each LPCK channel 429 can be a unit of LPCK access. For example, each UDB respectively stored in the respective LPCK channel 429 can be restored by the LPCK operation that uses data (e.g., PDB) stored in one or more memory dice of (e.g., corresponding to) the same LPCK channel 429.

Figure 4B:
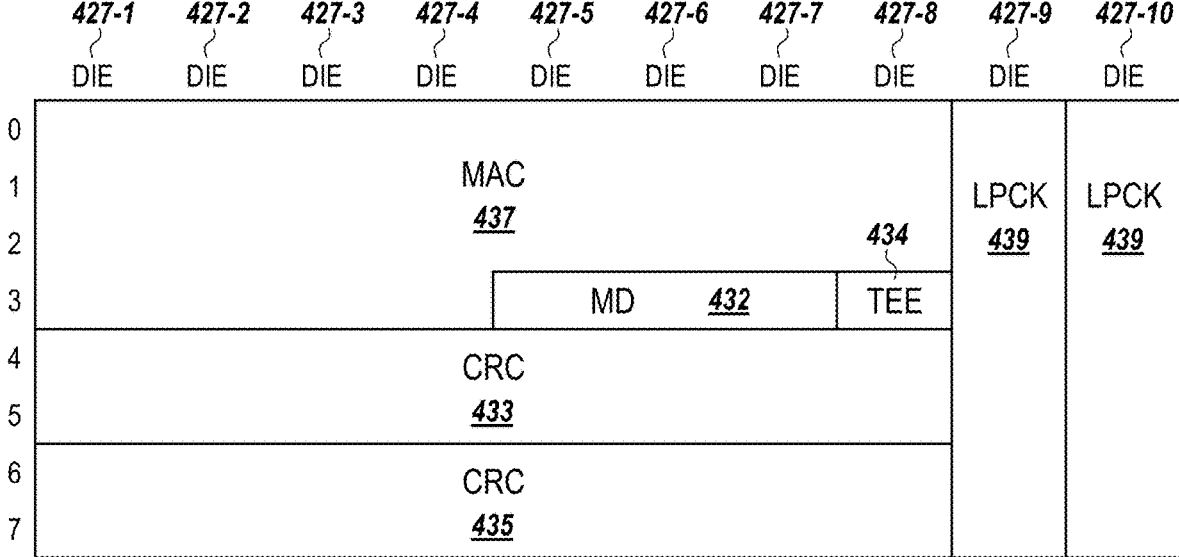
FIG. 4B-4D schematically illustrate various examples of how data of extra bits can be spread among memory dice in accordance with a number of embodiments of the present disclosure.
Figure 4C:
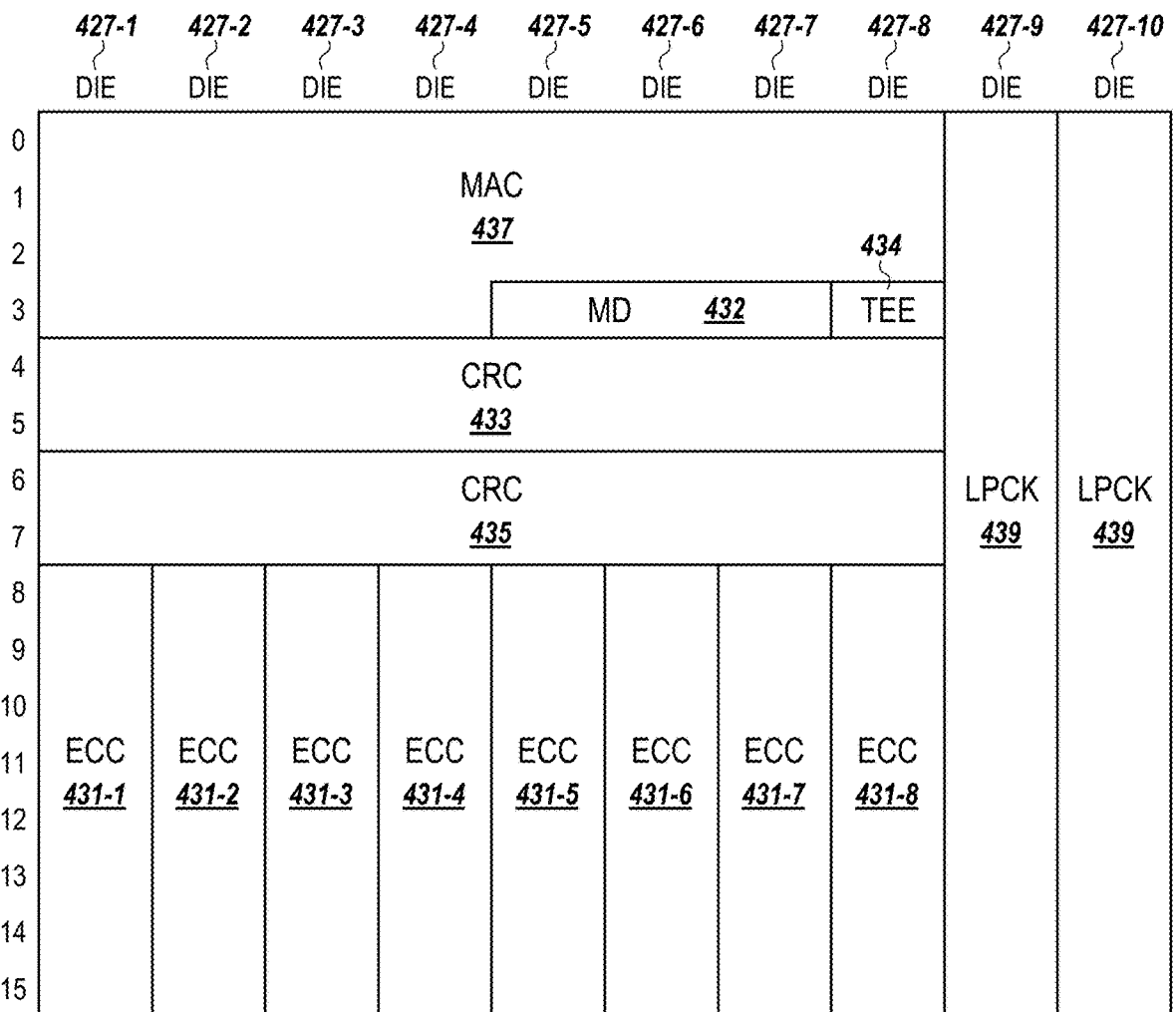
Figure 4D:
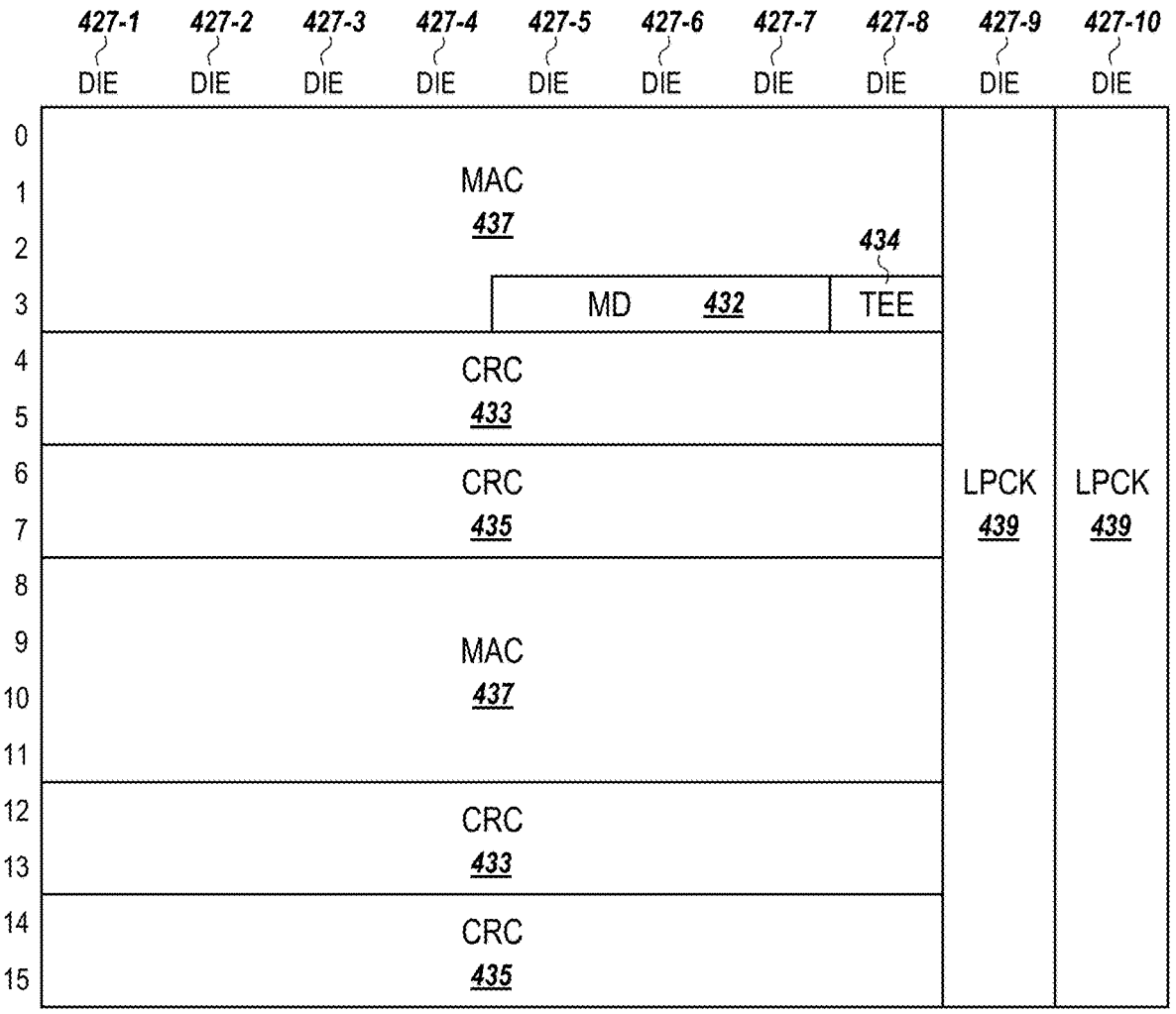

FIG. 4B-4D schematically illustrate various examples of how data of extra bits can be spread (e.g., allocated, partitioned, etc.) among memory dice in accordance with a number of embodiments of the present disclosure. Further, memory dice 427 illustrated in FIGS. 4B-4D can be analogous to memory dice 427-1, . . . , 427-10 of the LPCK channel illustrated in FIG. 4A.

Each memory die (e.g., memory die 427) is not illustrated in its entirety in FIGS. 4B-4D and can further include other portions that are not illustrated in FIGS. 4B-4D. For example, memory dice 427-1 to 427-8 can further include the other portions not illustrated in FIGS. 4B-4D that are configured to store, for example, an UDB. In some embodiments, data stored in these "portions" of the memory dice 427 illustrated in FIGS. 4B-4D can be transferred via DMI pins.

FIG. 4B schematically illustrates one example of how data of extra bits can be spread among memory devices in accordance with a number of embodiments of the present disclosure. An UDB (e.g., not illustrated in FIG. 4B) can be stored over the memory dice, such as over memory dice 427-1 to 427-8. The memory dice 427-9 and 427-10 can be dedicated for storing LPCK parity data. As illustrated in FIG. 4A, CRC data 433 (e.g., alternatively referred to as error detection information) stored over the memory dice 427-1, . . . , 427-8 can correspond to CRC data generated at the FCRC encoder 211-1 illustrated in FIG. 2A. CRC data 433 can be used (e.g., at the FCRC decoder 211-2) to perform an error detection operation on the UDB stored on the memory dice 427-1, . . . , 427-8. As illustrated in FIG. 4B, CRC data 435 (e.g., alternatively referred to as error detection information) stored over memory dice 427-1, . . . , 427-8 can correspond to CRC data generated at the CRC encoder 213-1 illustrated in FIGS. 2A and 2B. The CRC data 435 can be used (e.g., at a respective CRC decoder 213-2) to perform an error detection operation on the UDB stored over the memory dice 427-1, . . . , 427-8.

As illustrated in FIG. 4B, MAC data 437 (e.g., alternatively referred to as authentication data) stored over memory dice 427-1, . . . , 427-8 can correspond to authentication data generated at the authenticity/integrity encoder (e.g., authenticity/integrity encoder 218-1 illustrated in FIGS. 2A and 2B). MAC data 437 can be used to perform an authentication operation on the UDB stored over the memory dice 427-1, . . . , 427-8. As illustrated in FIG. 4B, LPCK data 439 (e.g., alternatively referred to as LPCK parity data) stored over memory dice 427-9 and 427-10 can correspond to parity data generated at the LPCK encoder 214-1 to perform an LPCK operation on UDBs stored in the memory dice 427-1, . . . , 427-8.

As illustrated in FIG. 4B, metadata ("MD" as shown in FIG. 4B) 432-1, . . . , 432-4 stored respectively in memory dice 427-4, 427-5, and 427-6 can correspond to meta data associated with the UDB stored over the memory dice 427-1, . . . , 427-8. Further, the memory dice 427 can be configured to store TEE data 434, such as in the memory die 427-8 as illustrated in FIG. 4B.

The memory dice 427-1, . . . , 427-10 are not configured to store ECC data (e.g., ECC data 431 illustrated in FIG. 4C), which indicates that the memory controller 200 operating with extra bits stored in memory dice as illustrated in FIG. 4B may disable the pairs of ECC encoders/decoders 216 and operate without performing error correction operations that would have been performed at the pairs.

As illustrated in FIG. 4B, the memory dice 427-1, . . . , 427-8 can be configured to store 28 bits of MAC data 437, 16 bits of CRC data 433, and 16 bits of CRC data 435. Further, the memory dice 427-5, 427-6, and 427-7 can be configured to store 3 bits of metadata, and the memory die 427-8 can be configured to store 1 bit of TEE 434.

FIG. 4C schematically illustrates another example of how data of extra bits can be spread among memory devices in accordance with a number of embodiments of the present disclosure. CRC data 433, CRC data 435, MAC data 437, LPCK data 439, metadata 432, and TEE 434 illustrated in FIG. 4C can be analogous to CRC data 433, CRC data 435, MAC data 437, LPCK data 439, metadata 432, and TEE 434 illustrated in FIG. 4B.

Data stored in memory dice 427 of FIG. 4C are generally analogous to the data stored in memory dice 427 of FIG. 4A, except that it includes ECC data 431-1, . . . , 431-8 respectively stored in the memory dice 427-1, . . . , 427-8. Each ECC data 431 can be used to perform an error correction operation (e.g., single-error-correction (SEC) operation) on a portion of the UDB stored in a same memory die. For example, the ECC data 431-1, . . . , 431-8 can be used to perform the error correction operation on the respective portion of the UDB stored in the memory dice 427-1, . . . , 427-8, respectively.

As illustrated in FIG. 4C, the memory dice 427-1, . . . , 427-8 can be configured to store 28 bits of MAC data 437, 16 bits of CRC data 433, 16 bits of CRC data 435, and 64 bits of ECC data 431. Further, the memory dice 427-5, 427-6, and 427-7 can be configured to store 3 bits of metadata, and the memory die 427-8 can be configured to store 1 bit of TEE 434.

FIG. 4D schematically illustrates yet another example of how data of extra bits can be spread among memory devices in accordance with a number of embodiments of the present disclosure. CRC data 433, CRC data 435, MAC data 437, LPCK data 439, metadata 432, and TEE 434 illustrated in FIG. 4C can be analogous to the CRC data 433, CRC data 435, MAC data 437, LPCK data 439, metadata 432, and TEE 434 illustrated in FIG. 4B.

As illustrated in FIG. 4D, the memory dice 427-1, . . . , 427-8 can be configured to store 57 bits of MAC data 437, 32 bits of CRC data 433, and 32 bits of CRC data 435. Further, the memory dice 427-5, 427-6, and 427-7 can be configured to store 6 bits of metadata, and the memory die 427-8 can be configured to store 1 bit of TEE 434.

Figure 5A:
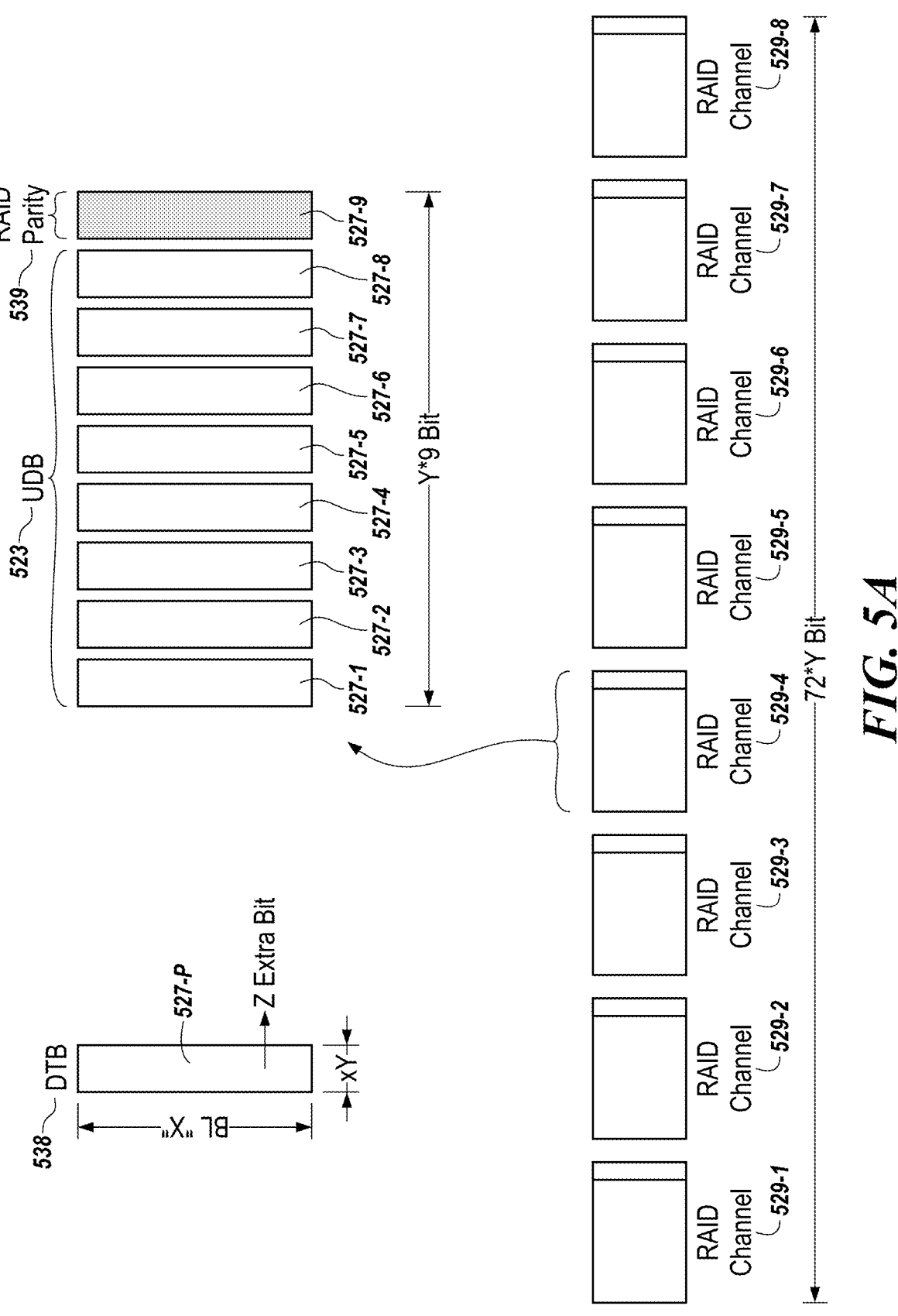
FIG. 5A is a block diagram of memory dice corresponding to one or more RAID channels in accordance with a number of embodiments of the present disclosure.

FIG. 5A is a block diagram of memory dice corresponding to one or more RAID channels (alternatively and generally referred to as data protection channels) in accordance with a number of embodiments of the present disclosure. An example memory die 527-P configured to store a DTB and illustrated in FIG. 5A is analogous to the example memory die 427-P. In some embodiments, DTB can be transferred over 16-bit burst length with 4-bit data transfer for each beat of the 16-bit burst length, which transfers a total of 16-bit of extra data from each memory die, such as the memory die 527-P. Further, memory dice 527-1, . . . , 527-8 over which an UDB 523 can be stored is analogous to the memory dice 427-1, . . . , 427-8 over which the UDB 423 can be stored.

Although embodiments are not so limited, four memory dice 527 can correspond to (e.g., a channel width of) the channel 125, 225, and/or 325 illustrated in FIGS. 1 and 2, respectively. For example, memory dice 527-1, . . . , 527-4 can correspond to one channel 125, 225, 325; memory dice 527-6, . . . , 527-8 can correspond to another channel 125, 225, 325; and memory dice 527-9 and 527-10 can correspond to (a quarter of) a different channel 125, 225, 325. Accordingly, each channel 125, 225, 325 can be 4*Y-bit wide (e.g., 16-bit wide).

Although embodiments are not so limited, each RAID channel can include one memory die (e.g., memory die 527-9) configured to store a PDB including RAID parity data 539 used to perform a RAID operation on one of the memory dice 527-1, . . . , 527-8 of each RAID channel, for example. Accordingly, each RAID channel can include eight memory dice 527-1, . . . , 527-8 (configured to store an UDB) and one memory die 527-9 (configured to store a PDB), which can be collectively referred to as a RAID channel. Accordingly, 9*Y bits (e.g., 36 bits) can be transferred for each beat of the X-bit burst length. Although embodiments are not so limited, each memory die 527-1, . . . , 527-9 of the LPCK channel can correspond (e.g., be coupled) to a different channel (e.g., the channel 125 and/or 325 illustrated in FIGS. 1, 3A, and/or 3B, respectively), which allows the memory dice 527-1, . . . , 527-9 of the LPCK channel to be accessed simultaneously.

The computing system (e.g., the computing system 101 illustrated in FIG. 1) can include a number of RAID channels, such as eight RAID channels 529-1, . . . , 529-8 (which can transfer 72*Y bits, such as 288 bits, for each beat of the X-bit burst length) as illustrated in FIG. 5A, although embodiments are not limited to a particular quantity of RAID channels the computing system can include. Each RAID channel 529 can be a unit of RAID access. For example, each UDB respectively stored in the respective RAID channel 529 can be restored by the RAID operation that uses data (e.g., PDB) stored in one or more memory dice of (e.g., corresponding to) the same RAID channel 529.

Figure 5B:
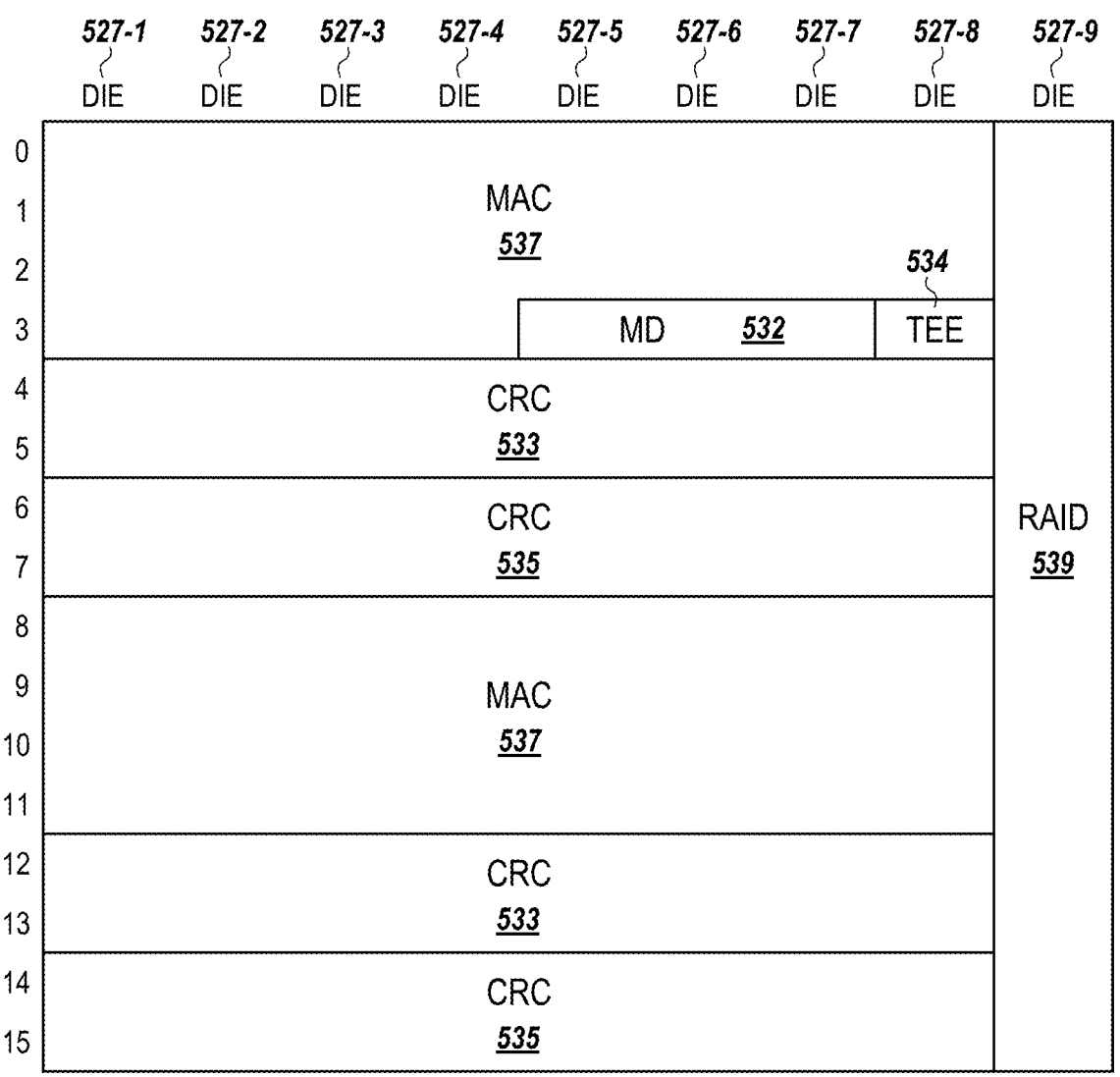
FIG. 5B schematically illustrates various examples of how data of extra bits can be spread among memory dice in accordance with a number of embodiments of the present disclosure.

FIG. 5B schematically illustrates an example of how data of extra bits can be spread among memory dice 527 in accordance with a number of embodiments of the present disclosure. Each memory die (e.g., memory die 527) is not illustrated in its entirety in FIG. 5B and can further include other portions that are not illustrated in FIG. 5B. For example, each memory die 527 can further include the other portions not illustrated in FIG. 5B that are configured to store, for example, UDBs. In some embodiments, data stored in these "portions" of the memory dice 527 illustrated in FIG. 5 can be transferred via DMI pins. The memory dice 527-1, . . . , 527-9 illustrated in FIG. 5B can be analogous to the memory dice 527-1, . . . , 527-9 of the RAID channel illustrated in FIG. 5A.

An UDB (e.g., not illustrated in FIG. 5B) can be stored over the memory dice, such as over memory dice 527-1 to 527-8. The memory die 527-9 can be dedicated for storing RAID parity data. As illustrated in FIG. 5B, CRC data 533 (e.g., alternatively referred to as error detection information) stored over the memory dice 427-1, . . . , 427-8 can correspond to CRC data generated at the ECC encoder 311-1 illustrated in FIG. 2A. CRC data 533 can be used (e.g., at a respective ECC decoder 311-2) to perform an error detection operation on the UDB stored on the memory dice 527-1, . . . , 527-8. As illustrated in FIG. 5B, CRC data 535 (e.g., alternatively referred to as error detection information) stored over memory dice 527-1, . . . , 527-8 can correspond to CRC data generated at the ECC encoder 313-1 illustrated in FIGS. 3A and 3B. The CRC data 535 can be used (e.g., at a respective CRC decoder 313-2 illustrated in FIGS. 3A and 3B) to perform an error detection operation on the UDB stored over the memory dice 527-1, . . . , 527-8.

As illustrated in FIG. 5B, MAC data 537 (e.g., alternatively referred to as authentication data) stored over memory dice 527-1, . . . , 527-8 can correspond to authentication data generated at the authenticity/integrity encoder (e.g., authenticity/integrity encoder 318-1 illustrated in FIGS. 3A and 3B). MAC data 537 can be used to perform an authentication operation on the UDB stored over the memory dice 527-1, . . . , 527-8.

As illustrated in FIG. 5B, RAID parity data 539 (e.g., alternatively referred to as LPCK parity data) stored over memory dice 527-9 can correspond to parity data generated at the RAID encoder 315-1 illustrated in FIGS. 3A and 3B to perform a RAID operation (e.g., at the RAID decoder 315-2 illustrated in FIGS. 3A and 3B) on UDBs stored in the memory dice 527-1, . . . , 527-8.

As illustrated in FIG. 5B, metadata ("MD" as shown in FIG. 5B) 532 stored respectively in memory dice 527-5, 527-6, and 527-7 can correspond to meta data associated with the UDB stored over the memory dice 527-1, . . . , 527-8. Further, the TEE data 535 can be stored in the memory die 527-8 as illustrated in FIG. 5B. The memory dice 527-1, . . . , 527-9 are not configured to store ECC data (e.g., ECC data 431 illustrated in FIG. 4C), which indicates that the memory controller 300 operating with extra bits stored in memory dice as illustrated in FIG. 5B may disable the pairs of ECC encoders/decoders 316 and operate without performing error correction operations that would have been performed at the pairs.

In a non-limiting example, an apparatus (e.g., the computing device 101 illustrated in FIG. 1) can include a memory controller (e.g., the memory controller 100, 200, and/or 300 illustrated in FIGS. 1, 2, and 3, respectively) and a number of memory devices (e.g., the memory devices 126, 226, and/or 326 illustrated in FIGS. 1, 2, and 3, respectively) configured to store a number of encrypted user data blocks (UDBs) (e.g., the UDB 423 and/or 523 illustrated in FIGS. 4 and 5, respectively). An UDB is a discrete unit of data transfer (e.g., data transfer unit) between the memory controller and the number of memory devices. The memory controller can be configured to, in response to receipt of a host read command to access a first UDB (e.g., the UDB 423 and/or 523 illustrated in FIGS. 4 and 5, respectively) from the number of memory devices, perform a first error detection operation on the first UDB using first error detection information (e.g., the CRC data 435 and/or 535 illustrated in FIGS. 4 and 5, respectively) generated based on the encrypted first UDB. The memory controller can be further configured to perform a first error correction operation on the first UDB using error correction information (e.g., the LPCK parity data 439 and/or RAID parity data 539 illustrated in FIGS. 4 and 5, respectively) generated based on the encrypted first UDB and decrypt the first UDB. The memory controller can be further configured to perform a second error detection operation on the first UDB using second error detection information (e.g., the CRC data 433 and/or 533 illustrated in FIGS. 4 and 5, respectively) generated based on the unencrypted first UDB.

In some embodiments, the memory controller can be configured to, prior to perform the first error detection operation on the first UDB, cause a memory device (e.g., one or more memory devices including memory dice 427-1 to 427-8 illustrated in FIG. 4 or 527-1 to 527-8 illustrated in FIG. 5) of the number of memory devices to transfer the first UDB, the first error detection information, and the error correction information to the memory controller. The memory controller can be further configured to cause the memory device to transfer the second error detection information to the memory controller.

In some embodiments, the memory controller can be configured to perform, to protect data integrity and authenticity of the first UDB, an authentication operation on the first UDB using authentication data (e.g., the MAC data 437 and/or 537 illustrated in FIGS. 4 and 5, respectively) generated based on the unencrypted first UDB. In some embodiments, the memory controller can be configured to perform a second error correction operation on the first UDB using second error correction information to correct a quantity of errors or detect errors more than the quantity of errors on a subset of the first UDB transferred from one memory die.

In some embodiments, the memory controller can be configured to cause, to perform the second error detection operation, a memory device (e.g., one or more memory devices including memory dice 427-9 to 427-10 illustrated in FIG. 4 or 527-9 illustrated in FIG. 5) of the number of memory devices to transfer a parity data block (PDB) to the memory controller to perform the first error correction operation and perform the first error correction operation using the PDB. The memory controller can be further configured to perform the first error detection operation independently of and subsequent to the first error correction operation.

Continuing with this example, the memory controller can be further configured to perform the first error detection operation prior to the first error correction operation. The memory controller can be further configured to perform the first error correction operation in response to the first error detection operation indicating one or more bit-errors in the first UDB. The memory controller can be further configured to skip performance of the first error correction operation in response to the first error detection operation indicating no errors in the first UDB.

In another non-limiting example, an apparatus (e.g., the computing device 101 illustrated in FIG. 1) can include a number of memory devices (e.g., the memory devices 126, 226, and/or 326 illustrated in FIGS. 1, 2, and 3, respectively). Each memory device can include a number of memory dice (e.g., the memory dice 427 and/or 527 illustrated in FIGS. 4 and/or 5). The apparatus can further include a memory controller (e.g., the memory controller 100, 200, and/or 300 illustrated in FIGS. 1, 2, and 3, respectively) coupled to the number of memory devices. The memory controller can be configured to generate, in response to receipt of a user data block (UDB) (e.g., the UDB 423 and/or 523 illustrated in FIGS. 4 and 5, respectively) as part of a host write command, error detection information (e.g., the CRC data 433 or 435 and/or 533 or 535 illustrated in FIGS. 4 and 5, respectively) based on an unencrypted version or encrypted version of the UDB to perform one or more error detection operations on the UDB. The UDB can be a unit of data transfer between the number of memory devices and the memory. The memory controller can be further configured to encrypt the UDB. The memory controller can be further configured to generate parity data (e.g., the LPCK parity data 439 and/or RAID parity data 539 illustrated in FIGS. 4 and 5, respectively) based on the encrypted UDB to be paired with the UDB as a stripe and to later perform an error correction operation (e.g., an LPCK and/or RAID operation) on the stripe using the parity data. The memory controller can be further configured to write the UDB and the parity data over the respective number of memory dice corresponding to one or more memory devices of the number of memory devices.

In some embodiments, the memory controller can be configured to encrypt the UDB using an advanced encryption standard (AES) algorithm. In some embodiments, the memory controller can be configured to write the UDB to a first subset of the respective number of memory dice (e.g., the memory dice 427-1, . . . , 427-8 and/or 527-1, . . . , 527-8 illustrated in FIGS. 4 and 5, respectively) and the parity data to a second subset of the respective number of memory dice (e.g., the memory dice 427-9 and 427-10 and/or 527-9 illustrated in FIGS. 4 and 5, respectively). In some embodiments, the memory controller can be configured to generate authentication data (e.g., the MAC data 437 and/or 537 illustrated in FIGS. 4 and 5, respectively) based on the unencrypted version of the UDB to protect data integrity and authenticity of the UDB and write the authentication data to the one or more memory devices along with the UDB. The authentication data can correspond to message authentication code (MAC) data.

In some embodiments, the error detection information can include first error detection information (e.g., the CRC data 433 and/or 533 illustrated in FIGS. 4 and 5, respectively). In this example, the memory controller can be configured to generate, prior to the encryption of the UDB, the first error detection information based on the unencrypted UDB.

In some embodiments, the error detection information can include second error detection information (e.g., the CRC data 435 and/or 535 illustrated in FIGS. 4 and 5, respectively). In this example, the memory controller can be configured to generate the second error detection information based on the encrypted UDB subsequent to the encryption of the UDB. In some embodiments, the stripe can be a unit of low-power chip kill (LPCK) access. In some embodiments, the stripe can be a unit of redundant array of independent disks (RAID) access.

FIG. 6 is a flow diagram of a method for non-cached data transfer in accordance with a number of embodiments of the present disclosure. The method 650 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 650 is performed by the memory controller 100, 200, and/or 300 illustrated in FIGS. 1-3, respectively. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 651, responsive to a host read command to access a first UDB from a memory device (e.g., one or more memory devices) of a number of memory devices (e.g., the memory devices 126, 226, and/or 326 illustrated in FIGS. 1, 2, and 3, respectively), a first error detection operation can be performed on the first UDB using first error detection information generated based on cypher text of the first UDB. Each UDB stored in the number of memory devices can be a discrete unit of data transfer from the number of memory devices.

At 653, a first error correction operation can be performed on the first UDB using error correction information generated based on the cypher text of the first UDB. At 655, the first UDB can be decrypted to convert the first UDB in cypher text form to plain text form.

At 657, an authentication operation can be performed (to protect data integrity and authenticity of the first UDB) on the first UDB using authentication data previously generated based on plain text of the first UDB. At 659, a second error detection operation can be performed on the first UDB using second error detection information generated based on the plain text of the first UDB.

In some embodiments, the first error detection operation can be performed prior to the first error correction operation. Further, the first error correction operation can be performed responsive to the first error detection operation indicating one or more errors in the first UDB.

In some embodiments, a second error correction operation can be performed prior to the first error detection operation to correct a quantity of errors in the first UDB. Further, the first error correction operation can be performed to correct the one or more errors that were uncorrectable from performing the second error correction operation.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a number of memory devices configured to store a number of encrypted user data blocks (UDBs), each UDB representing a discrete unit of data transfer for a host of the apparatus and the same discrete unit of data transfer between a memory controller and the number of memory devices;
wherein the memory controller is configured to, in response to receipt of a host read command to access a first UDB from the number of memory devices:
perform a first error detection operation on the first UDB using first error detection information generated based on the first UDB;
perform a first error correction operation on the first UDB using error correction information generated based on the first UDB;
decrypt the first UDB;
perform a second error detection operation on the first UDB using second error detection information generated based on the first UDB; and
perform, to protect data integrity and authenticity of the first UDB, an authentication operation on the first UDB using authentication data generated based on the unencrypted first UDB.

2. The apparatus of claim 1, wherein the memory controller is configured to, prior to performing the first error detection operation on the first UDB, cause a memory device of the number of memory devices to transfer the first UDB, the first error detection information, and the error correction information to the memory controller.

3. The apparatus of claim 2, wherein the memory controller is configured to cause, to perform the second error detection operation, the memory device to transfer the second error detection information to the memory controller.

4. The apparatus of claim 1, wherein the memory controller is configured to perform a second error correction operation on the first UDB using second error correction information to correct a quantity of errors more than the quantity of errors or detect errors more than the quantity of errors on a subset of the first UDB transferred from one memory die of a memory device of the number of memory devices.

5. The apparatus of claim 1, wherein the memory controller is configured to:
cause a memory device of the number of memory devices to transfer a parity data block (PDB) to the memory controller to perform the first error correction operation; and
perform the first error correction operation using the PDB.

6. The apparatus of claim 5, wherein the memory controller is configured to perform the first error detection operation independently of and subsequent to the first error correction operation.

7. The apparatus of claim 5, wherein the memory controller is configured to:
perform the first error detection operation prior to the first error correction operation;
perform the first error correction operation in response to the first error detection operation indicating one or more bit-errors in the first UDB; and
in response to the first error detection operation indicating no errors in the first UDB, bypass the first error correction operation.

8. An apparatus, comprising:
a number of memory devices each comprising a number of memory dice; and
a memory controller coupled to the number of memory devices and configured to:
generate, in response to receipt of a user data block (UDB) as part of a host write command, error detection information based on an unencrypted version or an encrypted version of the UDB to perform one or more error detection operations on the UDB, wherein the UDB is a unit of data corresponding to the host write command and to transfer between the number of memory devices and the memory controller;
encrypt the UDB;
generate parity data based on the UDB to be paired with the UDB as a stripe and to later perform an error correction operation on the stripe using the parity data;
write the UDB and the parity data to the respective number of memory dice corresponding to one or more memory devices of the number of memory devices;
generate authentication data based on the unencrypted version of the UDB; and
write the authentication data to the one or more memory devices along with the UDB.

9. The apparatus of claim 8, wherein the memory controller is configured to write the UDB to a first subset of the respective number of memory dice and the parity data to a second subset of the respective number of memory dice.

10. The apparatus of claim 8, wherein the authentication data corresponds to message authentication code (MAC) data.

11. The apparatus of claim 8, wherein:
the error detection information comprises first error detection information; and
the memory controller is configured to generate, prior to the encryption of the UDB, the first error detection information based on the unencrypted UDB.

12. The apparatus of claim 8, wherein:
the error detection information comprises second error detection information; and the memory controller is configured to generate the second error detection information based on the encrypted UDB subsequent to the encryption of the UDB.

13. The apparatus of claim 8, wherein the stripe is a unit of low-power chip kill (LPCK) access.

14. The apparatus of claim 8, wherein the stripe is a unit of redundant array of independent disks (RAID) access.

15. The apparatus of claim 8, wherein the memory controller is configured to encrypt the UDB using an advanced encryption standard (AES) algorithm.

16. A method, comprising:

performing, responsive to a host read command to access a first UDB from a memory device of a number of memory devices, a first error detection operation on the first UDB using first error detection information generated based on cypher text of the first UDB, wherein the first UDB is a discrete unit of data transfer for a host of the apparatus and the same discrete unit of data transfer from the number of memory devices;

performing a first error correction operation on the first UDB using error correction information generated based on the cypher text of the first UDB;

decrypting the first UDB to convert the first UDB in cypher text form to plain text form;

performing an authentication operation on the first UDB using authentication data previously generated based on the plain text of the first UDB;

performing a second error detection operation on the first UDB using second error detection information generated based on the plain text of the first UDB;

generating authentication data based on the unencrypted data of the first UDB; and performing an authentication operation on the first UDB using the generated authentication data.

17. The method of claim 16, further comprising:

performing the first error detection operation prior to the first error correction operation; and performing the first error correction operation responsive to the first error detection operation indicating one or more bit-errors in the first UDB.

18. The method of claim 17, further comprising:

performing a second error correction operation prior to the first error detection operation to correct a quantity of errors in the first UDB; and performing the first error correction operation to correct the one or more errors that were uncorrectable from performing the second error correction operation.

\* \* \* \* \*